United States Patent
Yang et al.

(10) Patent No.: US 12,518,203 B2
(45) Date of Patent: Jan. 6, 2026

(54) SYSTEMS AND METHODS FOR DECENTRALIZED ATTRIBUTION OF GENERATIVE MODELS

(71) Applicants: Yezhou Yang, Tempe, AZ (US); Changhoon Kim, Tempe, AZ (US); Yi Ren, Chandler, AZ (US)

(72) Inventors: Yezhou Yang, Tempe, AZ (US); Changhoon Kim, Tempe, AZ (US); Yi Ren, Chandler, AZ (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 1020 days.

(21) Appl. No.: 17/544,201

(22) Filed: Dec. 7, 2021

(65) Prior Publication Data
US 2022/0198332 A1 Jun. 23, 2022

Related U.S. Application Data

(60) Provisional application No. 63/122,306, filed on Dec. 7, 2020.

(51) Int. Cl.
*G06N 20/00* (2019.01)
*G06F 21/64* (2013.01)

(52) U.S. Cl.
CPC .............. *G06N 20/00* (2019.01); *G06F 21/64* (2013.01)

(58) Field of Classification Search
CPC ........ G06N 20/00; G06N 3/045; G06N 3/084; G06F 18/211; G06F 18/22
See application file for complete search history.

(56) References Cited

U.S. PATENT DOCUMENTS

2021/0004676 A1* 1/2021 Jaderberg ............... G06N 3/098

OTHER PUBLICATIONS

Song, M., Wang, Z., Zhang, Z., Song, Y., Wang, Q., Ren, J. and Qi, H., 2020. Analyzing user-level privacy attack against federated learning. IEEE Journal on Selected Areas in Communications, 38(10), pp. 2430-2444. (Year: 2020).*

Seward, C., Unterthiner, T., Bergmann, U., Jetchev, N. and Hochreiter, S., Jul. 2018, First order generative adversarial networks. In International Conference on Machine Learning (pp. 4567-4576). PMLR. (Year: 2018).*

Augenstein, S., McMahan, H.B., Ramage, D., Ramaswamy, S., Kairouz, P., Chen, M. and Mathews, R., 2019. Generative models for effective ML on private, decentralized datasets. arXiv preprint arXiv:1911.06679. (Year: 2019).*

(Continued)

*Primary Examiner* — April Y Blair
(74) *Attorney, Agent, or Firm* — Polsinelli PC

(57) ABSTRACT

A system and associated methods for decentralized attribution of GAN models is disclosed. Given a group of models derived from the same dataset and published by different users, attributability is achieved when a public verification service associated with each model (a linear classifier) returns positive only for outputs of that model. Each model is parameterized by keys distributed by a registry. The keys are computed from first-order sufficient conditions for decentralized attribution. The keys are orthogonal or opposite to each other and belong to a subspace dependent on the data distribution and the architecture of the generative model.

7 Claims, 13 Drawing Sheets
(9 of 13 Drawing Sheet(s) Filed in Color)

(56) References Cited

OTHER PUBLICATIONS

Liu, M., Zhang, W., Mroueh, Y., Cui, X., Ross, J., Yang, T. and Das, P., 2020. A decentralized parallel algorithm for training generative adversarial nets. Advances in Neural Information Processing Systems, 33, pp. 11056-11070. (Year: 2020).*
Goodfellow, I.J., 2014. On distinguishability criteria for estimating generative models. arXiv preprint arXiv:1412.6515. (Year: 2014).*
Alec Radford, Luke Metz, and Soumith Chintala. Unsupervised representation learning with deep convolutional generative adversarial networks, 2015. cite arxiv:1511.06434Comment: Under review as a conference paper at ICLR 2016.
Ali Breland. The bizarre and terrifying case of the "deepfake" video that helped bring an african nation to the brink. motherjones, Mar. 2019.
Anatol Z Tirkel, GA Rankin, RM Van Schyndel, WJ Ho, NRA Mee, and Charles F Osborne. Electronic watermark. Digital Image Computing, Technology and Applications (DICTA'93), pp. 666-673, 1993.
Andrew Brock, Jeff Donahue, and Karen Simonyan. Large scale gan training for high fidelity natural image synthesis. arXiv preprint arXiv:1809.11096, 2018.
Augustus Odena, Vincent Dumoulin, and Chris Olah. Deconvolution and checkerboard artifacts. Distill, 2016.
Deepak Pathak, Philipp Krahenbuhl, Jeff Donahue, Trevor Darrell, and Alexei A Efros. Context encoders: Feature learning by inpainting. In Proceedings of the IEEE conference on computer vision and pattern recognition, pp. 2536-2544, 2016.
E. Riba, D. Mishkin, D. Ponsa, E. Rublee, and G. Bradski. Kornia: an open source differentiable computer vision library for pytorch, 2019.
Faceswap. https://faceswap.dev. 2020.
Francesco Marra, Diego Gragnaniello, Luisa Verdoliva, and Giovanni Poggi. Do gans leave artificial fingerprints? In 2019 IEEE Conference on Multimedia Information Processing and Retrieval (MIPR), pp. 506-511. IEEE, 2019.
Han Zhang, Tao Xu, Hongsheng Li, Shaoting Zhang, Xiaogang Wang, Xiaolei Huang, and Dimitris N. Metaxas. Stackgan: Text to photo-realistic image synthesis with stacked generative adversarial networks. In The IEEE International Conference on Computer Vision (ICCV), Oct. 2017.
Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.
Jiren Zhu, Russell Kaplan, Justin Johnson, and Li Fei-Fei. Hidden: Hiding data with deep networks. In Proceedings of the European Conference on Computer Vision (ECCV), pp. 657-672, 2018.
Jun-Yan Zhu, Taesung Park, Phillip Isola, and Alexei A Efros. Unpaired image-to-image translation using cycle- consistent adversarial networks. In Proceedings of the IEEE international conference on computer vision, pp. 2223-2232, 2017.
Kundan Kumar, Rithesh Kumar, Thibault de Boissiere, Lucas Gestin, Wei Zhen Teoh, Jose Sotelo, Alexandre de Brebisson, Yoshua Bengio, and Aaron C Courville. Melgan: Generative adversarial networks for conditional waveform synthesis. In Advances in Neural Information Processing Systems, pp. 14881-14892, 2019.
Lixin Fan, Kam Woh Ng, and Chee Seng Chan. Rethinking deep neural network ownership verification: Embedding passports to defeat ambiguity attacks. In Advances in Neural Information Processing Systems, pp. 4716-4725, 2019.
Makena Kelly. Congress grapples with how to regulate deepfakes. Congress grapples with how to regulate deepfakes, Jun. 2019.
Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pp. 3213-3223, 2016.
Martin Heusel, Hubert Ramsauer, Thomas Unterthiner, Bernhard Nessler, and Sepp Hochreiter. Gans trained by a two time-scale update rule converge to a local nash equilibrium. In Advances in Neural Information Processing Systems, pp. 6626-6637, 2017.
Michael Albright, Scott McCloskey, and ACST Honeywell. Source generator attribution via inversion. arXiv preprint arXiv:1905.02259, 2019.
Ming-Shing Hsieh, Din-Chang Tseng, and Yong-Huai Huang. Hiding digital watermarks using multiresolution wavelet transform. IEEE Transactions on industrial electronics, 48(5):875-882, 2001.
Ning Bi, Qiyu Sun, Daren Huang, Zhihua Yang, and Jiwu Huang. Robust image watermarking based on multiband wavelets and empirical mode decomposition. IEEE Transactions on Image Processing, 16(8):1956-1966, 2007.
Ning Yu, Larry Davis, and Mario Fritz. Attributing fake images to gans: Analyzing fingerprints in generated images. arXiv preprint arXiv:1811.08180, 2018.
Nitish Shirish Keskar, Bryan McCann, Lav R Varshney, Caiming Xiong, and Richard Socher. Ctrl: A conditional transformer language model for controllable generation. arXiv preprint arXiv:1909.05858, 2019.
Ohad Fried, Ayush Tewari, Michael Zollhöfer, Adam Finkelstein, Eli Shechtman, Dan B Goldman, Kyle Genova, Zeyu Jin, Christian Theobalt, and Maneesh Agrawala. Text-based editing of talking-head video. ACM Transactions on Graphics (TOG), 38(4):1-14, 2019.
Raphael Satter. Experts: Spy used ai-generated face to connect with targets. Experts: Spy used AI-generated face to connect with targets, Jun. 2019.
Ron G Van Schyndel, Andrew Z Tirkel, and Charles F Osborne. A digital watermark. In Proceedings of 1st International Conference on Image Processing, vol. 2, pp. 86-90. IEEE, 1994.
Shelby Pereira and Thierry Pun. Robust template matching for affine resistant image watermarks. IEEE transactions on image Processing, 9(6):1123-1129, 2000.
Sheng-Yu Wang, Oliver Wang, Richard Zhang, Andrew Owens, and Alexei A Efros. Cnn-generated images are surprisingly easy to spot . . . for now. arXiv preprint arXiv:1912.11035, 2019.
Shruti Agarwal, Hany Farid, Ohad Fried, and Maneesh Agrawala. Detecting deep-fake videos from phoneme-viseme mismatches. In Proc. Conference on Computer Vision and Pattern Recognition Workshops, 2020.
Takeru Miyato, Toshiki Kataoka, Masanori Koyama, and Yuichi Yoshida. Spectral normalization for generative adversarial networks. arXiv preprint arXiv:1802.05957, 2018.
Tero Karras, Samuli Laine, and Timo Aila. A style-based generator architecture for generative adversarial networks. In Proceedings of the IEEE Conference on Computer Vision and Pattern Recognition, pp. 4401-4410, 2019.
Tero Karras, Samuli Laine, Miika Aittala, Janne Hellsten, Jaakko Lehtinen, and Timo Aila. Analyzing and improving the image quality of stylegan. arXiv preprint arXiv:1912.04958, 2019.
Tero Karras, Timo Aila, Samuli Laine, and Jaakko Lehtinen. Progressive growing of gans for improved quality, stability, and variation. arXiv preprint arXiv:1710.10196, 2017.
Ting-Chun Wang, Ming-Yu Liu, Jun-Yan Zhu, Andrew Tao, Jan Kautz, and Bryan Catanzaro. High-resolution image synthesis and semantic manipulation with conditional gans. In Proceedings of the IEEE conference on computer vision and pattern recognition, pp. 8798-8807, 2018.
Ting-Chun Wang, Ming-Yu Liu, Jun-Yan Zhu, Guilin Liu, Andrew Tao, Jan Kautz, and Bryan Catanzaro. Video-to-video synthesis. arXiv preprint arXiv:1808.06601, 2018.
Wikipedia contributors. Deepfake—Wikipedia, the free encyclopedia, 2019. [Online; accessed Jun. 17, 2019].
Yann LeCun and Corinna Cortes. MNIST handwritten digit database. 2010.
Yunjey Choi, Minje Choi, Munyoung Kim, Jung-Woo Ha, Sunghun Kim, and Jaegul Choo. Stargan: Unified generative adversarial networks for multi-domain image-to-image translation. In Proceedings of the IEEE conference on computer vision and pattern recognition, pp. 8789-8797, 2018.

(56) References Cited

OTHER PUBLICATIONS

Yunjey Choi, Youngjung Uh, Jaejun Yoo, and Jung-Woo Ha. Stargan v2: Diverse image synthesis for multiple domains. arXiv preprint arXiv:1912.01865, 2019.

Ziwei Liu, Ping Luo, Xiaogang Wang, and Xiaoou Tang. Deep learning face attributes in the wild. In Proceedings of International Conference on Computer Vision (ICCV), 2015.

* cited by examiner

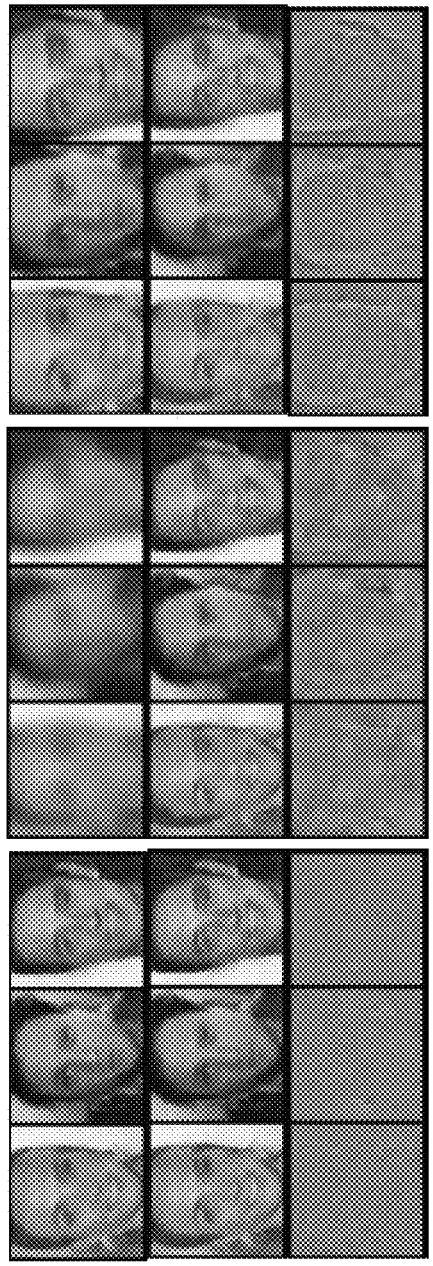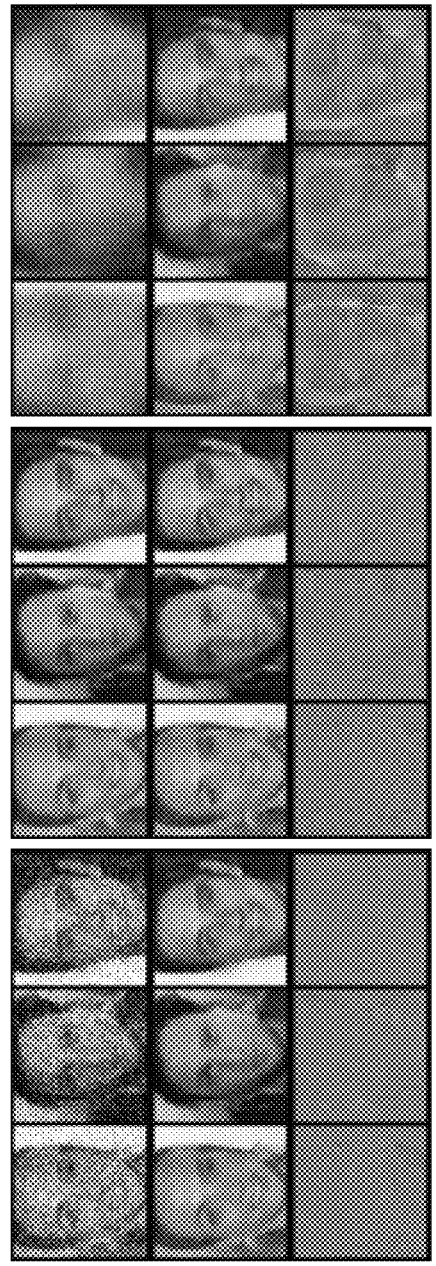
FIG. 4A Non-robust  FIG. 4B Blurring  FIG. 4C Cropping  FIG. 4D Noise  FIG. 4E JPEG  FIG. 4F Combination Non-robust Blurring Cropping Noise

JPEG

Combination

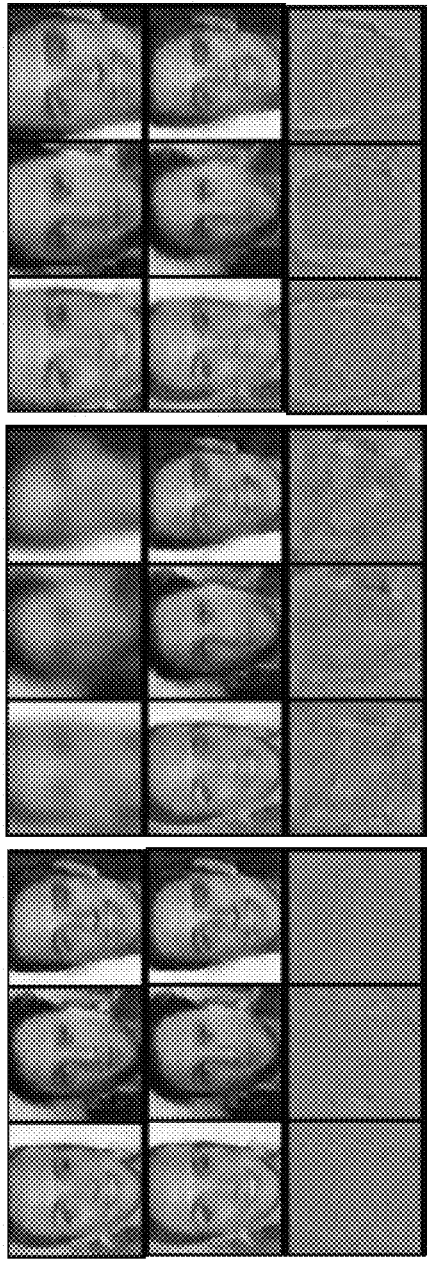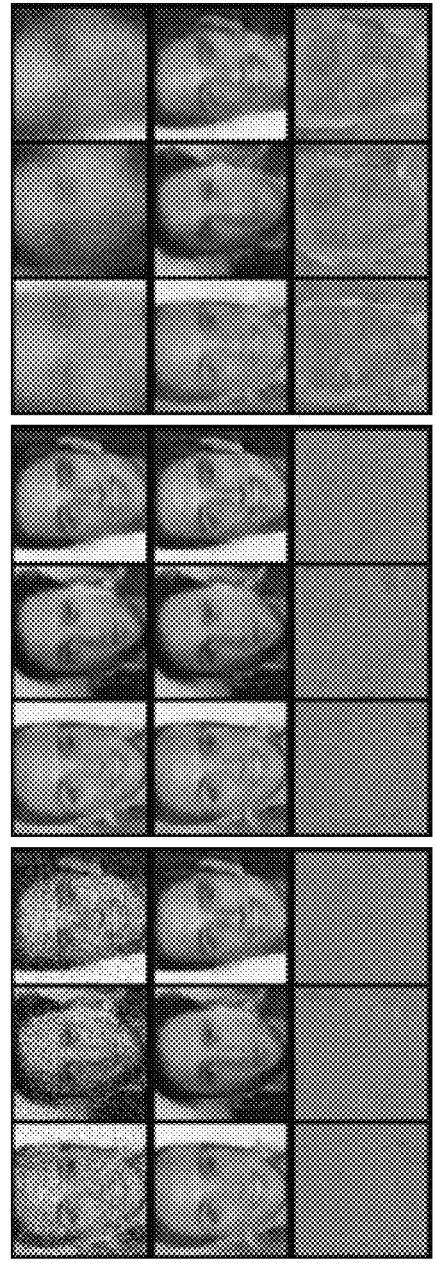

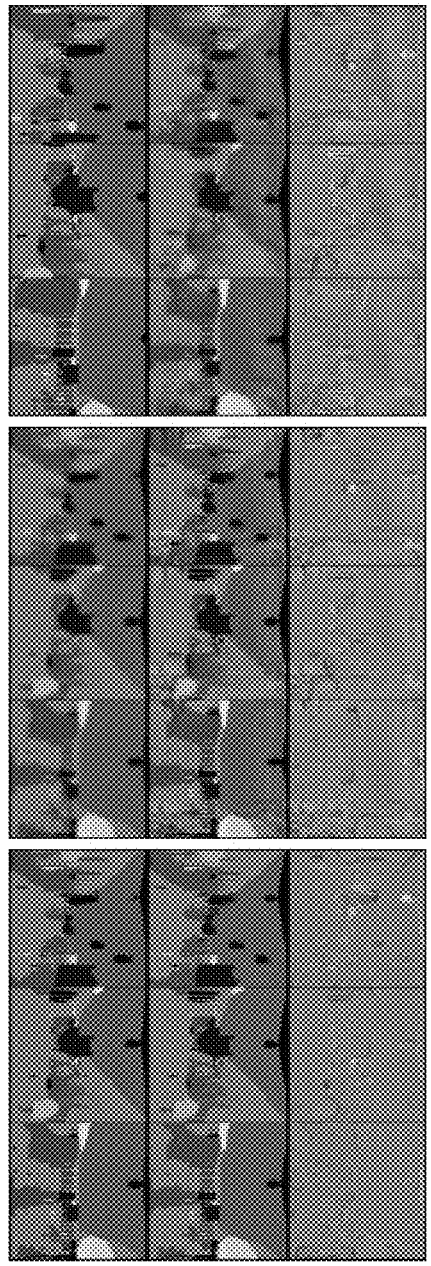
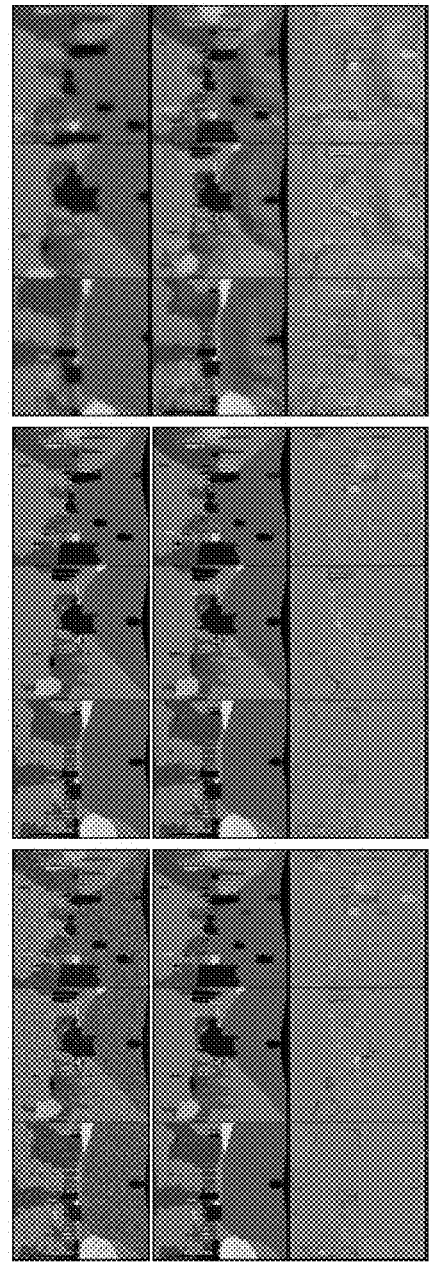

SYSTEMS AND METHODS FOR DECENTRALIZED ATTRIBUTION OF GENERATIVE MODELS

CROSS REFERENCE TO RELATED APPLICATIONS

This is a U.S. Non-Provisional patent application that claims benefit to U.S. provisional patent application Ser. No. 63/122,306 filed on Dec. 7, 2020, which is herein incorporated by reference in its entirety.

FIELD

The present disclosure generally relates to artificial intelligence and associated issues thereof; and in particular, to decentralization attribution of generative models.

BACKGROUND

There have been growing concerns regarding the fabrication of content through generative models. Specifically, for example, recent advances in generative models have enabled the creation of synthetic content that are indistinguishable even by naked eyes. Such successes raised serious concerns regarding adversarial applications of generative models, e.g., for the fabrication of user profiles, articles, images, audios, and videos. Necessary measures have been called for the filtering, analysis, tracking, and prevention of malicious applications of generative models before they create catastrophic sociotechnical damages. In particular, a need exists for attribution of machine-generated contents back to its source model to facilitate IP protection and content regulation.

It is with these observations in mind, among others, that various aspects of the present disclosure were conceived and developed.

SUMMARY

Aspects of the present disclosure may take the form of a system for decentralized attribution of generative models, and/or methods thereof. In some examples, the system includes a processor configured with instructions to provide a registry and verification service that improves attribution of a generative adversarial network (GAN) relative to other versions of the GAN. Specifically, the processor accesses a dataset and a GAN associated with the dataset, computes a plurality of keys and a plurality of corresponding GANs such that at least one key is computed for each GAN of the plurality of GANs, each GAN of the plurality of GANs being a version of the GAN modified by the at least one key, wherein the plurality of keys are derived from first-order sufficient conditions for decentralized attribution, and the processor verifies a GAN of the plurality of GANs based upon an output of a query associated with the GAN.

The present disclosure may further take the form of a tangible, non-transitory, computer-readable media having instructions encoded thereon, the instructions, when executed by a processor, being operable to: compute a sequence of keys by a registry for key-dependent GAN models, the keys configured for strict data compliance and orthogonality so as to accommodate tracing of machine-generated contents back to its source model, wherein the keys are orthogonal or opposite to each other and belong to a subspace dependent on the data distribution and the architecture of the generative model.

Other examples are contemplated and supported by the disclosure described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-4F are a series of images respectively showing: (a) 1st-2rd row: samples from $G_D$ and non-robust generator (b-f) 1st-2rd rows: worst case post-process, samples from robust training against the specific post-processes (prior to the post processes). $3^{rd}$ row for all: differences between $2^{nd}$ row of (a) and $2^{nd}$ row of each image. As a result, we can reveal the changes in the attributions.

FIGS. 9A-9F are a series of images showing DCGAN-CelebA.

FIGS. 10A-10F are a series of images showing Cycle-GAN-Cityscapes.

Corresponding reference characters indicate corresponding elements among the view of the drawings. The headings used in the figures do not limit the scope of the claims.

DETAILED DESCRIPTION

Figure 1C:
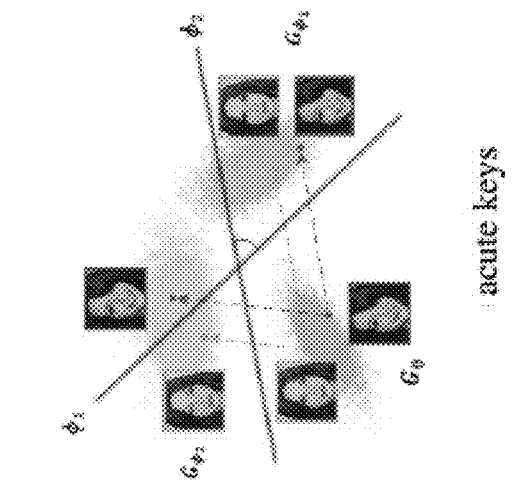
FIGS. 1A-1C are a series of illustrations respectively showing: (a) a protocol of decentralized attribution, keys being distributed by the registry and used to produce key-dependent generators for individual users; (b) orthogonal keys achieve distinguishability and attributability; and (c) acute keys achieve distinguishability but not attributability.

There have been growing concerns regarding the fabrication of contents such as realistic-appearing photos and human faces through generative models. The present disclosure investigates the feasibility of decentralized attribution of fabricated content to such models. Given a group of models derived from the same dataset and published by different users, attributability of a generative model is achieved when a public verification service associated with each model (a linear classifier) returns positive only for outputs of that model. Attribution allows tracing of machine-generated contents back to its source model, thus facilitating IP-protection and content regulation. Decentralized attribution prevents forgery of source models by only allowing users to have access to their own classifiers, which are parameterized by keys distributed by a registry. One notable feature of the present disclosure is the development of design rules for the keys, which are derived from first-order sufficient conditions for decentralized attribution. Through validation on MNIST, CelebA and Cityscapes, it is shown that keys may be (1) orthogonal or opposite to each other and (2) belonging to a subspace dependent on the data distribution and the architecture of the generative model. This paper also empirically examines the trade-off between generation quality and robust attributability against adversarial post-processes of model outputs.

INTRODUCTION

Existing studies primarily focused on the detection of machine-generated contents. Marra et al., incorporated by reference in its entirety, ("Do gans leave artificial fingerprints?" In 2019 IEEE Conference on Multimedia Information Processing and Retrieval (MIPR), pages 506-511. IEEE, 2019) showed empirical evidence that generative adversarial networks (GANs) may come with data-specific fingerprints in the form of averaged residual over the generated distribution, yet suggested that generative models trained on similar datasets may not be uniquely distinguishable through fingerprints. Yu et al., incorporated by reference in its entirety, ("Attributing fake images to gans: Analyzing fingerprints in generated images." arXiv preprint arXiv: 1811.08180, 2018) showed on the other hand that it is empirically feasible to attribute a finite and fixed set of GAN models derived from the same dataset, i.e., correctly classifying model outputs by their associated GANs. While encouraging, their study did not prove that attribution can be achieved when the model set continues to grow (e.g., when GAN models are distributed to end users in the form of mobile apps). In fact, Wang et al., incorporated by reference in its entirety, ("Cnn-generated images are surprisingly easy to spot . . . for now." arXiv preprint arXiv: 1912.11035, 2019) showed that detectors trained on one generative model are transferable to other models trained on the same dataset, indicating that individually trained detectors may perform incorrect attribution, e.g., by attributing images from one model belonging to user A to another model belonging to user B. It should be highlighted that most of the existing detection mechanisms are centralized, i.e., the detection relies on a registry that collects all models and/or model outputs and empirically look for collection-wise features that facilitate detection. This fundamentally limits the scalability of detection tools in real-world scenarios where an ever growing number of models are being developed even for the same dataset.

Problem Formulation

Figure 1B:
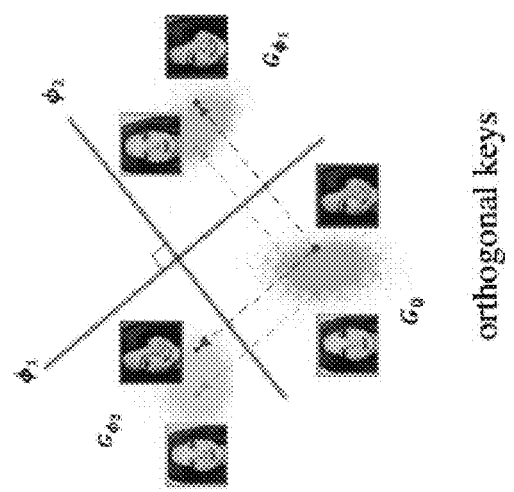
Figure 1A:
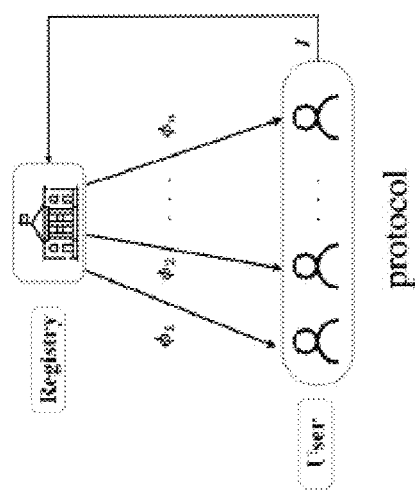

A motivation intuitively exists to investigate the feasibility of a decentralized approach to ensuring the correct attribution of generative models. Specifically, one can assume that for a given dataset $\mathcal{D}$, the registry only distributes keys, $\Phi:=\{\phi_1, \phi_2, \ldots\}$, to users of generative models without collecting information from the users' models. Each key is held privately by a user, whose key-dependent model is denoted by $G_\phi(\cdot; \theta): \mathbb{R}^{d_z} \to \mathbb{R}^{d_x}$ where $z$ and x are latent and output variables, respectively, and $d_z$ and $d_x$ the corresponding dimensionalities. $\theta$ are the model parameters. When necessary, $\theta$ and $\phi$ are suppressed to reduce notational burden. The distribution of each key is accompanied by that of a public verification service, which tells whether a query belongs to $G_\phi$ (labeled as 1) or not (labeled as $-1$). The underlying binary classifier is called as a verifier and denoted by $f_\phi: \mathbb{R}^{d_x} \to \{-1,1\}$. In some embodiments of the present disclosure, the focus is on linear classifiers: $f_\phi(x) = \text{sign}(\phi^T x)$. In one example: Consider that a registry (run by a company) develops a new GAN model for photo post-processing. Individuals download the app that includes a GAN model and a key. The installation modifies the GAN according to the keys so that the resulting model can be verified. The keys are then deleted from the users' end. All outputs from the user-end models can now be traced back to the users (FIG. 1).

The following quantities are central to investigation: The distinguishability of $G_\phi$ is defined as $$D(G_\phi) := \mathbb{E}_{x \sim P_{G_\phi}, x' \sim P_D}\left[\frac{1}{2}\mathbb{1}(f_\phi(x) = 1) + \frac{1}{2}\mathbb{1}(f_\phi(x') = -1)\right], \quad (1)$$

where $P_D$ is the authentic data distribution, and $P_{G_\phi}$ the model distribution induced by $G_\phi$. The attributability of a collection of generative models $\mathcal{G} := \{G_1 \ldots G_N\}$ is defined as:

$$A(\mathcal{G}) := \sum_{i=1}^{N} \frac{1}{2N} \quad (2)$$

$$\left(\mathbb{E}_{x \sim P_{G_{\phi_i}}}\left[\mathbb{1}(f_{\phi_i}(x) = 1)\right] + \frac{1}{N-1}\sum_{j \in \{1,\ldots,N\} \setminus i} \mathbb{E}_{x' \sim P_{G_{\phi_j}}}\left[\mathbb{1}(f_{\phi_i}(x') = -1)\right]\right)$$

Distinguishability of G (attributability of $\mathcal{G}$) is achieved when $D(G)=1(A(\mathcal{G})=1)$. Lastly, a root model sent to all users along the key is denoted by $G(\cdot;\theta_0)$ (or shortened as $G_0$), and it is further assumed that $P_{G_0} = P_D$. A (lack of) generation quality of $G_\phi$ is measured through both the Fréchet Inception Distance (FID) score and the $l_2$ norm of the mean output perturbation $$\Delta x(\phi) = \mathbb{E}_{z \sim P_z}[G_\phi(z;\theta) - G(z;\theta_0)] \quad (3)$$

where $P_z$ is the latent distribution.

The present disclosure answers the following question: What are the rules for designing keys, so that the resultant generative models can achieve distinguishability individually and attributability collectively?

Contributions—Features and Advantages

It is believed the present disclosure provides the following contributions:

First-order sufficient conditions for distinguishability and attributability are developed to connect the aforementioned metrics with a geometry of the data distribution, a sensitivity of the generative model, angles between keys, and the generation quality.

The sufficient conditions yield simple design rules for the keys, which should be (1) data compliant, i.e., $f_\phi(x)=-1$ for $x \sim P_D$, (2) orthogonal or opposite to each other, and (3) within a model- and data-dependent subspace to maintain generation quality.

This disclosure empirically validates the design rules and studies the capacity of keys using Deep Convolutional GAN (DCGAN), Probabilistic GAN (PGAN), and CycleGAN on MNIST (database), CelebA, and the Cityscape datasets.

Additionally, this disclosure empirically tests tradeoffs between generation quality and robust attributability under post-processes including image blurring, cropping, noising, JPEG conversion, and a combination of all, and shows that robust attributability can be achieved, with degraded yet acceptable generation quality.

Notations. Throughout the present disclosure, the ith element of vector a is denoted by $a_{(i)}$, and $A_{(i,j)}$ the (i,j)th element of matrix A. $\|a\|_H^2 = a^T H a$ for vector a and matrix H. $\nabla_{xy|x_0}$ is the gradient of $y$ with respect to x, evaluated at $x=x_0$. Supp(P) is used to denote the support of distribution P.

Key Design for Distinguishability, Attributability, and Generation Quality

A Toy Case

Connections among distinguishability, attributability, and generation quality are illustrated through a toy case with the following settings: (1) One-hot orthogonal keys: Let $\phi i_i \in \Phi$ be one-hot and $\phi^T \phi' = 0$ for all $\phi \neq \phi'$. (2) Data compliance: Let $x \sim P_D$ have negative elements so that $f_\phi(x) = -1$ for all x, i.e., the authentic data is correctly attributed by all verifiers as not belonging to their associated generators. (3) Distinguishability through output perturbation: A key-dependent generative model $G_\phi$ achieves distinguishable output distribution $P_{G_\phi}$ by adding a fixed and bounded perturbation $\delta$ to the output of the root model $G_0$:

$$\min_{\|\delta\| \leq \varepsilon} \mathbb{E}_{x \sim P_D} \left[ \max\{1 - (x + \delta)^T \phi, 0\} \right], \quad (4)$$

where $\varepsilon > 0$. The solution to Eq. (4) is $\delta^*(\phi) = \varepsilon \, \text{sign}(\phi) = \varepsilon \phi$, which yields $\|\Delta x\| = \|\delta^*\| = \varepsilon$. With these settings, we have the following proposition (proof provided below):

Proposition 1. (Toy case) If $$\|\Delta x\| > \max_{x \sim P_D} \{\|x\|_\infty\}, D(G_\phi) = 1 \, \forall \phi \in \Phi \text{ and } A(\mathcal{G}) = 1.$$

While simplistic, Proposition 1 reveals that (1) the lower bound on the degradation of generation quality to suffice distinguishability is dependent on the data geometry, and (2) orthogonality of the keys ensures attributability. These properties are preserved for a more realistic case discussed below.

A More Realistic Case

A few modifications are made to the toy case: (1) Normalized keys: The system considers data-compliant keys $\phi \in \mathbb{R}^{d_x}$ in a convex cone, and constrain $\|\phi\| = 1$ for identifiability. (2) Distinguishability through model parameter perturbation: The output perturbation in the toy case can be reverse engineered and removed when generative models are white-box to end users. Therefore, to the system perturbs model parameters instead through the following problem:

$$\min_{\|\theta - \theta_0\| \leq \varepsilon} \mathbb{E}_{z \sim P_z} \left[ \max\{1 - \phi^T G_\phi(z; \theta), 0\} \right]. \quad (5)$$

Distinguishability. Start by a first-order analysis, where it is assumed that for a small $\varepsilon$, Eq. (5) is solved by a gradient descent step:

$$\Delta \theta = \gamma \mathbb{E}_{x \sim P_{G_0}} \left[ \nabla_\theta x T \big|_{\theta_0} \right] \phi$$

with $\gamma > 0$, and a linear approximation can capture the perturbation from $x_0 = G(z; \theta 0)$ to $x = G(z; \theta_0)$ for latent $z: x = x_0 + \nabla_\theta x_0 |_{\theta_0} \Delta \theta$. Here the data-compliance condition: $1 - \phi^T x > 0$ for $x \sim P_{G_\phi}$ is used for the approximation of $\Delta \theta$. To reduce notational burden, denote by $J(x) := \nabla_{\theta x}^T |_{\theta_0}$ the Jacobian of $G_0$ with respect to its parameters, and let $$M = \mathbb{E}_{x \sim P_{G_0}} [J(x)] \mathbb{E}_{x \sim P_{G_0}} [J(x)]^T \in \mathbb{R}^{d_x \times d_x}.$$

The following conjectures about J(x) and M are empirically tested:

Conjecture 1. Let the (i,j)th element of $$\sum (x) = J(x) \mathbb{E}_{x \sim P_{G_0}} [J(x)]^T - M$$

be $\Sigma_{(i,j)}$ with variance $\sigma_{ij}^2$. Then $\Sigma_{(i,j)}$ is approximately drawn independently from $\mathcal{N}(0, \sigma_{ij}^2)$.

Conjecture 2. Denote by $\Lambda = \{\lambda_1 \ldots \lambda_{d_x}\}$ the eigenvalues of M. For existing deep generative models, there exists a large subset of similarly small eigenvalues.

Remarks. $\{\sigma_{ij}^2\}$ reflects the difficulty of controlling generative models: Let $J_i(x)^T$ be the ith row of J(x) and $$\bar{J}_i = \mathbb{E}_{x \sim P_{G_0}} [J_i(x)].$$

$J_i(x)$ represents the sensitivity of the sensitivity of the ith element of $x \sim P_{G_0}$ with respect to $\theta_0$. Let $\Delta J_i = J_i - \bar{J}_i$, then $$H_i = \mathbb{E}_{x \sim P_{G_0}} \left[ \Delta J_i \Delta J_i^T \right]$$

is the variance-covariance matrix of $J_i(x)$. Let $\Delta_i(x) - J_i^T(x) \Delta \theta$ be the perturbation along the ith element of x due to $\Delta \theta$, and $\bar{\Delta}_i = \bar{J}_i^T \Delta \theta$ the expected perturbation. Lastly, let $\text{Var}(\Delta_i) = \|\Delta \theta\|_{H_i}^2$, be the variance of the perturbation. For $\Delta \theta$ with unit norm, we can show that $\text{Var}(\Delta_i) = \sigma_{ij}^2 / \|\bar{J}_j\|^2$ when $\Delta \theta$ is chosen to maximize $\bar{\Delta}_j (\Delta \theta = \bar{J}_j / \|\bar{J}_j\|)$. Therefore, $\sigma_{ij}^2$ reflects the difficulty of controlling supp($P_{G_\phi}$) through $\Delta \theta$. $\sigma_{ij}^2$ concentrates at zero for DCGANs on MNIST and CelebA.

The first-order sufficient conditions for model distinguishability is as follows (proof below):

Theorem 1. (Realistic case) Let $$d_{max}(\phi) = \max_{x \sim P_D} |\phi^T x|, \, \sigma^2(\phi) = \sum_{i,j} \sigma_{ij}^2 \phi_{(i)}^2 \phi_{(j)}^2,$$

and $\delta_d$ be a positive number greater than $$\exp\left(-\frac{1}{2}\left(\frac{\phi^T M \phi}{\phi(\phi)}\right)^2\right)$$

for a data-compliant key $\phi \in \Phi$. If $$\|\Delta x(\phi)\| \geq \frac{d_{max}(\phi)\sqrt{\phi^T M^2 \phi}}{\phi^T M \phi - \sigma(\phi)\sqrt{\log\left(\frac{1}{\delta_a^2}\right)}} \quad (6)$$

then $D(G_\phi) \geq 1 - \delta_d/2$.

Remarks. Theorem 1 reveals the connection between distinguishability and generation quality: In addition to the data geometry ($d_{max}$) as in the toy case, the lower bound of the generation quality also depends on model-related properties (M and $\sigma$). It should be noted that the lower bound is over approximated when a $\phi^T M \phi$ is small: Specifically, it is shown below empirically that distinguishability can be achieved even when $\phi^T M \phi$, is small. We hypothesize that this is due to the nonlinear change of $\sigma(\phi)$ along the gradient descent process.

Generation quality. Note that the mean perturbation following the first-order analysis is $$\Delta x = \mathbb{E}_{x_0 \sim P_{G_0}}[x - x_0] = \mathbb{E}_{x \sim P_{G_0}}\left[\gamma J(x) \mathbb{E}_{x \sim P_{G_0}}[J(x)]\phi\right] = \gamma M \phi.$$

Figure 2A:
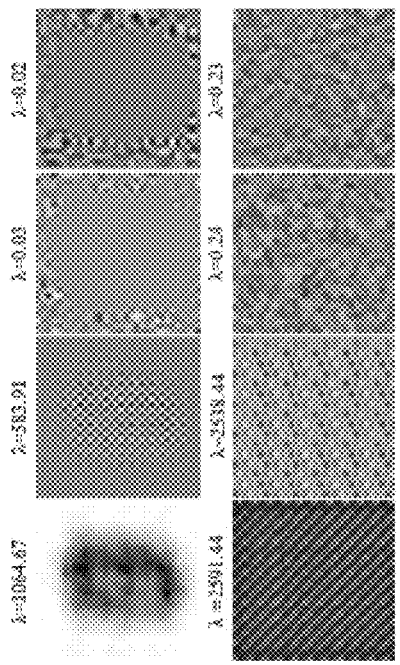
FIGS. 2A and 2B are respective a graphical illustration of: (a) Eigenvectors for the two largest and two smallest eigenvalues of M for DCGANS on MNIST (top) and CelebA (bottom); and (b) Left to Right: Samples from $G_0$ and subtraction of $G_0$-$G_{eigenvectors}$.
Figure 2B:
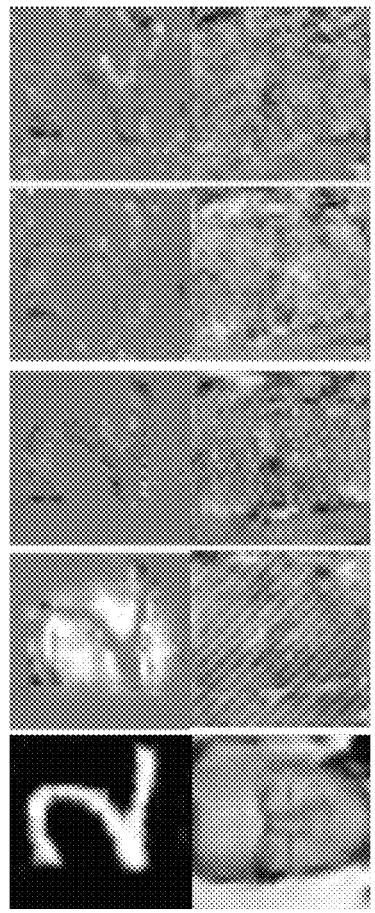

We verify through experiments that for $\phi$ that are eigenvectors of M, $\Delta x \propto \phi$ (FIG. 2B). These together with Theorem 1 lead to the following conjecture consistent with intuition, again tested through experiments (shown below):

Conjecture 3. $\|\Delta x\| \leq \tau d_{max}$, where $\tau$ is finite and dependent on the condition number of M.

There are two aspects of generation quality that we care about: First, for $\|\Delta x\|$ to be small, Conjecture 3 suggests that we should pick $\phi$ with small $d_{max}$. Second, Spectral analysis of M for MNIST and CelebA shows that $\phi$s corresponding to large eigenvalues have more structured patterns, while those for small eigenvalues resemble white noise. As a result, keys in the eigenspace of small eigenvalues of M achieve better FID scores and are preferred for maintaining the salient contents of the authentic data. FIG. 2A shows the eigenvectors of the largest and smallest eigenvalues of M for DCGANs on MNIST and CelebA. FIG. 2B are the outputs of the corresponding models that achieve distinguishability.

Attributability. The first-order sufficient conditions for attributability are as follows (proof below):

Theorem 2. Let $$d_{min}^* = \min_{\phi \in \Phi, x \sim P_D}|\phi^T x|, \; \bar{\sigma}^2(\phi) = \sqrt{\phi^T V^T V \phi - (\phi^T V \phi)^2}$$

where $V_{(i,j)} = \sigma_{ij}^2$. If $D(G) \geq 1 - \delta_d$ for all $G_\phi \in \mathcal{G}$, $\phi^T \phi' \leq 0$ for all $\phi, \phi' \in \Phi$, and $$\|\Delta x(\phi)\| \leq \frac{d_{min}^*\sqrt{\phi^T M^2 \phi}}{\sqrt{\phi^T M^2 \phi - (\phi^T M \phi)^2} + \sigma(\phi)\sqrt{\log\left(\frac{1}{\delta_a^2}\right)}}, \quad (7)$$

for all $\phi \in \Phi$, then $A(\mathcal{G}) \geq 1 - (\delta_d + \delta_a)/2$.

Remarks. (1) Conflict exists between distinguishability and attributability: The degradation of generation quality is lower bounded for distinguishability yet upper bounded for attributability. This is because the former requires model distributions to be away from $\mathcal{D}$, while the latter requires $G_\phi$ to stay away from the half spaces $\{x \in \mathbb{R}^{d_x} | \phi'^T x > 0\}$ of all other keys $\phi' \neq \phi$ (see FIG. 1B).

(2) Attributability is inherently limited by the model architecture: There are two reasons for $G_\phi$ to enter $\{x \in \mathbb{R}^{d_x} | \phi'^T x > 0\}$ by moving away from $\mathcal{D}$: (i) $P_{G_\phi}$ diverges as we perturb $\theta$ due to non-zero $\bar{\sigma}^2(\phi)$; (ii) the center of support($P_{G_\phi}$) moves along $M\phi$ rather than $\phi$. In the special case where $\bar{\sigma}^2(\phi) = 0$ and $M\phi \propto \phi$ (when M has a condition number of 1), the upper bound on $\|\Delta x\|$ becomes $+\infty$.

(3) Keys need to be strictly data compliance: When $d_{min}^* = 0$, support($\mathcal{D}$) is tangent to one of the keys. Attributability cannot be achieved unless $\bar{\sigma}^2(\phi)$ and $M\phi \propto \phi$.

(4) $\phi^T \phi'$ implies orthogonal and opposite keys: $\phi^T \phi' \leq 0$ requires $\phi$ and $\phi'$ to have an orthogonal or obtuse angle. Note that for a given vector space, the capacity of keys to satisfy $\phi^T \phi' \leq 0$ for all $\phi \neq \phi'$ is achieved when all keys are orthogonal or opposite to each other. Therefore, we can focus on computing orthogonal keys (and flipping their signs to get the other half).

The above analysis suggests the following rules for designing keys: (R1) strict data compliance, (R2) orthogonality, (R3) small $d_{max}$, and (R4) belonging to the eigenspace of M associated with small eigenvalues.

Key generation. The registry computes a sequence of keys to satisfy (R1) and (R2) for decentralized attribution:

$$\phi_i = \arg\min_{\|\phi\|=1} \mathbb{E}_{x \sim P_D, G_0}[\max\{1 + f_\phi(x), 0\}] + \sum_{j=1}^{i-1}|\phi_j^T \phi|. \quad (8)$$

The orthogonality penalty is omitted for the first key. Some remarks: (1) For fast computation of keys, we convexify Eq. (8) by removing the unit norm constraint. Each key is normalized right after solving the relaxed problem. (2) $P_\mathcal{D}$ and $P_{G_\phi}$ do not perfectly match in practice, and therefore expectations are taken over both distributions. (3) We use a hinge loss to promote strict data compliance. (4) Computation of $d_{max}$ requires minimax, and M is not always available for deep generative models due to their large parameter space. Therefore, we do not explicitly enforce (R3) or (R4), but will use them for generation quality control (see Sec. 4).

Generative models. To train key-dependent models, Eq. (5) is relaxed by introducing a penalty on the generation quality:

$$\min_{\theta_i} \mathbb{E}_{z \sim P_z}[\max\{1 - f_{\phi_i}(G_i(z; \theta_i)), 0\} + C\|G_0(z) - G_i(z; \theta_i)\|^2 / d_x]. \quad (9)$$

The hyperparameter C is tuned through a parametric study (see Appendices K).

Robust training. Lastly, we consider the scenario where outputs are post-processed before being verified. We train a robust version of the generative models against a distribution of post-processes $T: \mathbb{R}^{d_x} \to \mathbb{R}^{d_x} \sim P_T$ through $$\min_{\theta_i} \mathbb{E}_{z \sim P_z, T \in P_T}[\max\{1 - f_{\phi_i}(T(G_i(z; \theta_i))), 0\} + C\|G_0(z) - G_i(z; \theta_i)\|^2 / d_x]. \quad (10)$$

TABLE 1

Empirical averaged distinguishability ($\bar{D}$), attributability ($A(\mathcal{G})$), $\Delta x$ and FID scores from 20 generative models for each dataset. Standard deviations reported when applicable, or omitted if $\leq 0.05$. FID of $G_0$ ($FID_0$) is the baseline. FID is not applicable to CycleGAN.

| GANs | Angle | Dataset | $\bar{D}$ | $A(\mathcal{G})$ | $\|\Delta.r\|$ | $FID_0$ | FID |
|---|---|---|---|---|---|---|---|
| DCGAN | Orthogonal | MNIST | 0.99 | 0.99 | 5.20(0.31) | 4.98(0.15) | 5.68(0.23) |
| DCGAN | 45 degree | MNIST | 0.99 | 0.64 | 5.63(0.39) | — | 5.85(0.32) |
| DCGAN | Orthogonal | CelebA | 0.99 | 0.99 | 4.19(0.18) | 33.95(0.13) | 52.09(2.20) |
| DCGAN | 45 degree | CelebA | 0.99 | 0.59 | 4.75(0.20) | — | 59.57(2.56) |
| PGAN | Orthogonal | CelebA | 0.99 | 0.99 | 9.29(0.95) | 13.31(0.07) | 21.62(1.73) |
| PGAN | 45 degree | CelebA | 0.99 | 0.71 | 12.03(1.56) | — | 28.84(3.37) |
| CycleGAN | Orthogonal | Cityscapes | 0.99 | 0.99 | 55.85(3.67) | — | — |
| CycleGAN | 45 degree | Cityscapes | 0.99 | 0.69 | 54.94(5.20) | — | — |

Experiments

Settings. We test three widely adopted generative models, DCGAN, PGAN, and Cycle-GAN, and three datasets: MNIST, CelebA and Cityscape. See below for details on GAN settings and dataset descriptions. For the root models, we train DCGANs from scratch on MNIST and CelebA, and use pre-trained PGAN and CycleGAN.

We answer the following questions empirically through experiments.

Can decentralized attributability be achieved through orthogonal keys? For each dataset, we compute twenty keys (Eq. (8)) and their corresponding generative models (Eq. (9)). Table 1 reports the empirical averaged distinguishability and attributability for the collections. For comparison, we randomly sample 20 data-compliant keys by solving an alternative to Eq. (8) where the angle between keys is constrained to 45 deg. The results are presented in the same table. Generation quality metrics ($\|\Delta x\|$ and FID) are reported in the same table.

Figure 3B:
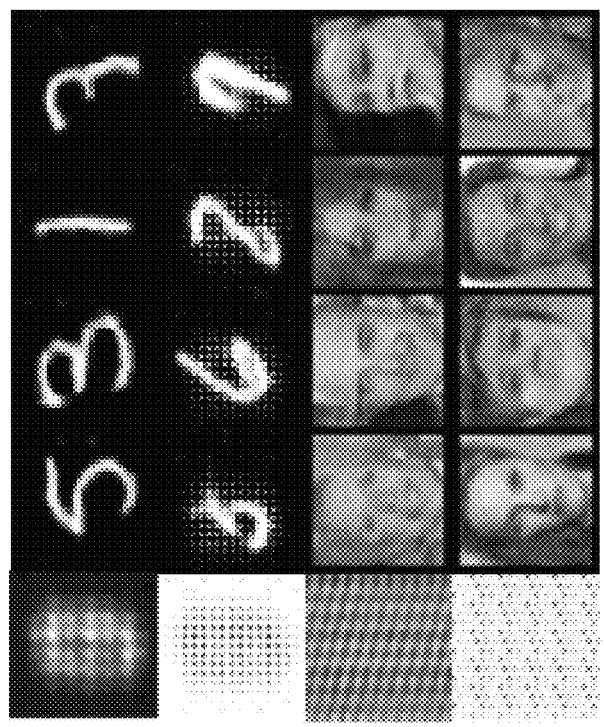
FIGS. 3A and 3B are respective graphical illustrations showing (a) a graph showing $d_{max}$ is bounded by $\|\Delta_x\|$ and $o_i$ are close to 0; and (b) an illustration showing Eigenvectors and the corresponding samples from (top to bottom) the largest eigenvector of third layer and last layer of $M_{MNIST}$, the largest eigenvector of third layer and last layer of $M_{CelebA}$.
Figure 3A:
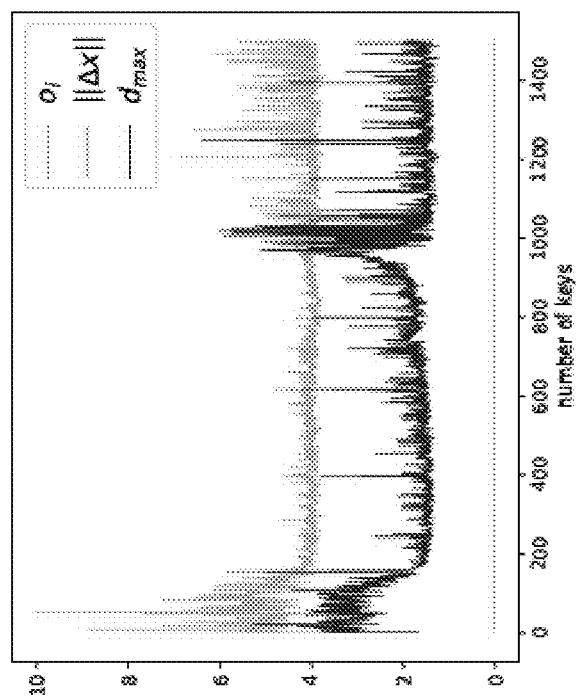

Is there a limited capacity of keys? For real-world applications, we would need the capacity of keys to achieve decentralized attribution to be large. From the analysis, the capacity is limited by the availability of orthogonal keys, which is required by attribution, and the generation quality. In FIG. 3A, we report the quantities for 1500 keys generated for MNIST: Orthogonality $$o_i = \sum_{j=1}^{i-1} |\phi_j^T \phi_i|/(i-1)(o_1 = 0),$$

key-perturbation correlation $c_i = \phi_i^T M \phi_i$, $d_{max}(\phi_i)$, distinguishability $D(G_{\phi_i})$, attributability $A(\{G_{\phi_j}\}_{j=1}^i)$, and generation quality for $i=1, \ldots, 1500$. Some remarks: (1) Nearly orthogonal keys abound due to the high-dimensionality of the output space, for which decentralized attribution is achieved. (2) Larger $c_i$ indicates more involvement of the key in the eigenspace of M with large eigenvalues. There is a positive correlation (0.63) between c and the FID scores, as expected. (3) $d_{max}$ is bounded and so is $\|\Delta x\|$. Samples from the generator with the largest $\|\Delta x\|$ are illustrated in FIG. 3A. The results suggest that the registry can use c and $d_{max}$ to monitor the generation quality.

Approximation of M: Since the computation of M (thus c) is expensive for deep generative models with high-dimensional outputs, we seek an empirical approximation of M. Our hypothesis is that the structured patterns associated with eigenvectors of large eigenvalues are mostly associated with in the sensitivities with respect to parameters from the later layers of the generators, and therefore we can approximate M using part of the Jacobian with respect to only those layers. To test the hypothesis, we train relatively shallow DCGANs for MNIST and CelebA, and compute the cosine similarities between the eigenvectors of M with the largest eigenvalue and those from the approximations of M using the last two layers. Results are presented in FIG. 3B, and suggest that it is viable to approximate the largest eigenvectors using the last layers.

How do post-processes affect attributability and generation quality? We consider five types of post-processes: blurring, cropping, noise, JPEG conversion and the combination of these four, and assume that the post-processes are known by the model publishers who then improve the robustness of decentralized attribution by incorporating these processes as differentiable layers and solving Eq. (10). Examples of the post-processed images from non-robust and robust generators are compared in FIGS. 4A-4F. Implementation: Blurring uses Gaussian kernel width uniformly drawn from $\frac{1}{3}\{1,3,5,7,9\}$. Cropping crops images with uniformly picked ratio between 80% and 100% and scales the cropped images back to the original size using bilinear interpolation. Noise adds iid white noise with standard deviation uniformly drawn in [0, 0.3]. JPEG applies JPEG compression. Combination performs each attack with a 50% chance in the order of Blurring, Cropping, Noise and JPEG. We use implementations for differentiable blurring and JPEG. For robust training against each post-process, we apply the post-process to mini-batches with 50% probability. Results: We report in Table 2 the attributability before and after robust training of distinguishability. Blurring, Cropping and Combination are all effective before robust training. Defense against these random post-processes can be achieved except for Combination. Table 3 reports $\|\Delta x\|$ and FID scores of the robust models, showing the trade-off between attributability and generation quality. See below for more results of robust training.

Related Work

Fingerprints of GANs. Researches have shown that convolutional neural network based generator leaves artifacts. Marra et. al. empirically showed that the artifact can be used as a fingerprint.

TABLE 2

Distinguishability (top), attributability (btm) before (Bfr) and after (Aft) robust training.

| GANs | Dataset | Blurring | | Cropping | | Noise | | JPEG | | Combination | |
|---|---|---|---|---|---|---|---|---|---|---|---|
| | | Bfr | Aft | Bfr | Aft | Bfr | Aft | Bfr | Aft | Bfr | Aft |
| DCGAN | MNIST | 0.49 | 0.96 | 0.52 | 0.99 | 0.85 | 0.99 | 0.54 | 0.99 | 0.50 | 0.66 |
| DCGAN | CelebA | 0.49 | 0.99 | 0.49 | 0.99 | 0.95 | 0.98 | 0.51 | 0.99 | 0.50 | 0.85 |
| PGAN | CelebA | 0.50 | 0.98 | 0.51 | 0.99 | 0.97 | 0.99 | 0.96 | 0.99 | 0.50 | 0.76 |
| CycleGAN | Cityscapes | 0.49 | 0.92 | 0.49 | 0.87 | 0.98 | 0.99 | 0.55 | 0.99 | 0.49 | 0.67 |
| DCGAN | MNIST | 0.49 | 0.96 | 0.49 | 0.97 | 0.85 | 0.98 | 0.53 | 0.99 | 0.49 | 0.65 |
| DCGAN | CelebA | 0.50 | 0.99 | 0.50 | 0.99 | 0.95 | 0.99 | 0.51 | 0.99 | 0.50 | 0.85 |
| PGAN | CelebA | 0.50 | 0.97 | 0.50 | 0.99 | 0.96 | 0.98 | 0.96 | 0.99 | 0.50 | 0.76 |
| CycleGAN | Cityscapes | 0.50 | 0.92 | 0.50 | 0.86 | 0.97 | 0.98 | 0.54 | 0.99 | 0.50 | 0.67 |

TABLE 3

$\|\Delta x\|$ (top) and FID score (btm) w/ and w/o robust training. Standard deviations in parenthesis. DCGAN-M: DCGAN for MNIST, DCGAN-C: DCGAN for CelebA. FID score not applicable to CycleGAN. Lower is better.

| GANs | Non-robust | Blurring | Cropping | Noise | JPEG | Combination |
|---|---|---|---|---|---|---|
| DCGAN-M | 5.20(0.31) | 15.96(2.18) | 9.17(0.65) | 5.93(0.34) | 6.48(0.94) | 17.08(1.86) |
| DCGAN-C | 4.19(0.18) | 11.83(0.65) | 9.30(0.31) | 4.75(0.17) | 6.01(0.29) | 13.69(0.59) |
| PGAN | 9.29(0.95) | 18.49(2.04) | 21.27(0.81) | 10.20(0.81) | 10.08(1.03) | 24.82(2.33) |
| CycleGAN | 55.85(3.67) | 68.03(3.62) | 80.03(3.59) | 55.47(1.60) | 57.42(2.00) | 83.94(4.66) |
| DCGAN-M | 5.68(0.23) | 41.11(20.43) | 21.58(2.44) | 5.79(0.19) | 6.50(1.70) | 68.16(24.67) |
| DCGAN-C | 52.09(2.20) | 73.62(6.70) | 98.86(9.51) | 59.51(1.60) | 60.35(2.57) | 87.29(9.29) |
| PGAN | 21.62(1.73) | 28.15(3.43) | 47.94(5.71) | 25.43(2.19) | 22.86(2.06) | 45.16(7.87) |

However, their method depends on the dissimilarities of the target data. Yu et al. trained external classifier to identify the images from a finite and fixed set of generators, and showed that the classifier can achieve robustness against post-processed images by fine-tuning the classifier using post-processed images. But the result is not guaranteed to have the same performance when the set of generators grows arbitrarily. Albright et al. showed that they can find the origin of images by solving the generator inversion problem. This method requires that the registry save all generators. Furthermore, the registry needs to solve the optimization problem for all generators.

Digital watermarking. Digital watermarking has been used for identifying the ownership of digital signals. Research on watermarking focused on the least significant bits in images and frequency domain. Zhu et al. showed that GANs can be used for watermarking by introducing various operation layers to the training step. Since watermarks are directly added to the outputs, they are similar to the presented toy case. Along the same direction, Fan et al. imposed passport to classification networks. Without proper passport, the classification accuracy of the network drops. Their approach, however, has not been extended to the decentralized attribution setting.

Conclusion

This paper investigated the feasibility of decentralized attribution for generative models. We used a protocol where a registry generates and distributes keys to users, and the user creates a key-dependent generative model for which the outputs can be correctly attributed by the registry. Our investigation led to simple design rules of the keys to achieve correct attribution while maintaining reasonable generation quality. Specifically, correct attribution requires keys to be data compliant and orthogonal; and generation quality can be monitored through data- and model-dependent metrics. With concerns about adversarial post-processes, we empirically show that robust attribution can be achieved with further loss of generation quality. This study defines the design requirements for future protocols for the creation and distribution of attributable generative models.

Broader Impact

With recent advances of generative models, researchers focus on the potential misuses and their forensics. Current state-of-the-art models can generate realistic fake images, voices and videos. Against these developments, studies of forensic have also been in the spotlight. This paper takes a different perspective than this ongoing competition between the two sides. We are motivated by the requirement of model attribution, i.e., the ability to tell which exact models do the contents come from, in addition to whether the contents are machine generated or not.

To this end, the paper focused on a regulation approach in the setting where generative models are white-box to end users, keys are black-box (withheld by the model publishers), and datasets are proprietary. While we focus on the technical feasibility of decentralized attribution of generative models, the applicability of the proposed method would require discussions beyond the scope of the paper. We assume that the protocol, i.e., key distribution by the model publisher and key-dependent training on the user end, can be embraced by all stakeholders involved (e.g., social media platforms and news organizations). While this protocol does not eliminate risks from individual adversaries, it will be a necessary constraint on publishers that have the computational, technological, and data resources to create and distribute high-impact machine-generated contents.

Proof of Proposition 1

Proposition 1. For the toy case, if $$\epsilon > \max_{x \sim P_D} \{\|x\|_\infty\}, D(G_\phi) = 1$$

for all $\phi \in \Phi$ and $A(\mathcal{G}) = 1$.

Proof. Let φ and φ' be any pair of keys such that $\phi^T\phi'=0$, and let x, x', and $x_0$ be sampled from $$P_{G_\phi}, P_{G_{\phi'}},$$

and $P_D$, respectively. When $\epsilon > \max_{x \sim P_D}\{\|x\|_\infty\}$, we have $$\phi^T x = \tag{11}$$
$$\phi^T(x_0 + \epsilon\phi) = \phi^T x_0 + \epsilon > \phi^T x_0 + \max_{x \sim P_D}\{\|x\|_\infty\} > \phi^T x_0 - \phi^T x_0 = 0.$$

Combined with the data-compliant assumption $\phi^T x_0 < 0$, we have $D(G_\phi)=1$. Further, since $$\phi^T x' = \phi^T(x_0 + \epsilon\phi') = \phi^T x_0 < 0, \tag{12}$$

we have $A(\mathcal{G})=1$.

Empirical Test for the Linear Approximation

For first-order analyses, we approximate the key-dependent generative model to be updated from the root model through $\theta = \theta_0 + \Delta\theta$, where $$\Delta\theta = \gamma \mathbb{E}_{x \sim P_{G_0}}\left[\nabla_\theta x^T \big|_{\theta_0}\right]\phi, \tag{13}$$

and $$x = x_0 + \nabla_\theta x_0\big|_{\theta_0} \Delta\theta. \tag{14}$$

Let $J(x) = \nabla_\theta x\big|_{\theta_0}$ and $$M = \mathbb{E}_{x \sim P_{G_0}}[J(x)]\mathbb{E}_{x \sim P_{G_0}}[J(x)^T].$$

We focus on testing the following result of the linear approximation: For φ and $G_\phi$ with high distinguishability, we should observe that with high probability, $$\phi^T \tilde{x} = \phi^T\left(x_0 + \gamma J(x_0)\mathbb{E}_{x \sim P_{G_0}}[J(x)^T]\phi\right) > 0, \tag{15}$$

for $x_0 \sim P_{G_\phi}$. To test this, we use a DCGAN trained on MNIST as $G_0$. We train 20 keys and update Gs correspondingly following the method detailed in the Experiments section. The resulting average distinguishability from the 20 generative models is 0.99.

To compute $\Pr(\phi^T \tilde{x} > 0)$, we calculate $J(x_0)$ and $$\mathbb{E}_{x \sim P_{G_0}}[J(x)]$$

based on samples from $G_0$. From Eq. (13), $$\|\Delta\theta\| = \left\|\gamma\mathbb{E}_{x \sim P_{G_0}}[J(x)^T]\phi\right\| = \gamma\sqrt{\phi^T M \phi}.$$

Therefore $\gamma = \|\Delta\theta\|/\sqrt{\phi^T M \phi}$. $\|\Delta\theta\gamma$ can be directly computed by comparing θ and $\theta_0$; M can be computed through SVD on $$\mathbb{E}_{x \sim P_{G_0}}[J(x)]$$

(the tested DCGAN has 1,065,984 parameters, and output dimension of 1024, thus $J \in \mathbb{R}^{1021 \times 1,065,984}$). Empirical test showsro $$\frac{1}{20}\sum_{x \sim P_{G_0}}[J(x)]^T - M$$

Empirical test for Conjecture 1

Conjecture 1. Let the (i,j)th element of $$\sum(x) = J(x)\mathbb{E}_{x \sim P_{G_0}}[J(x)^T] - M$$

be $\Sigma_{(i,j)}$ a with variance $\sigma_{i,j}^2$. Then $\Sigma_{(i,j)}$ is approximately drawn i.i.d. from $\mathcal{N}(0, \sigma_{i,j}^2)$.

Normality. We use a DCGAN trained on MNIST as $G_0$ and collect 512 samples of Σ by sampling $x_0 \sim P_{G_o}$. We empirically pick the best distributions for $\Sigma_{(i,j)}$. To do that, we calculate the Akaike Information Criterion (AIC) and the Bayesian Information Criterion (BIC) for each $\Sigma_{(i,j)}$ (10242 calculations in total). Candidate distributions include beta, bimbaumsaunders, exponential, extreme value, gamma, generalized extreme value, generalized pareto, inversegaussian, logistic, loglogistic, lognormal, nakagami, normal, rician, tiocationscale, and weibull distributions. We only report AIC and BIC of normal and extreme value distributions. Among all, the lowest mean AIC and BIC are found from the normal distribution (AIC=−26.51 and BIC=−18.03). The second best comes from the extreme value distribution (AIC=161.42 and BIC=169.90). From the reported results, we argue that it is reasonable to assume normality for $\Sigma_{(i,j)}$.

Independence. Due to normality, we test independence through correlations. In theory, this requires a 10242-by-10242 covariance matrix for all $\Sigma_{(i,j)}$. Without overloading the computational resources, we randomly pick one elements from $\Sigma_{(i,j)}$ and compute correlation coefficient with others ($1024^2$ calculation). We do such calculation for fifty times without duplication. The resulting average absolute value of the correlations is smaller than 0.1, suggesting that the independence assumption is reasonable. Multiple repetition of calculations did not show notable variations of correlations.

Empirical test for Conjecture 2

Conjecture 2. Denote $\Lambda = \{\lambda_1 \ldots \lambda_{d_x}\}$ as the eigenvalues of M. For existing deep generative models, there exists and only exists a subset of eigenvalues that are strictly positive.

We use the same DCGAN trained on MNIST and CelebA as the root models to compute $$\mathbb{E}_{x \sim P_{G_0}}[J].$$

Figures 5A, 5B:
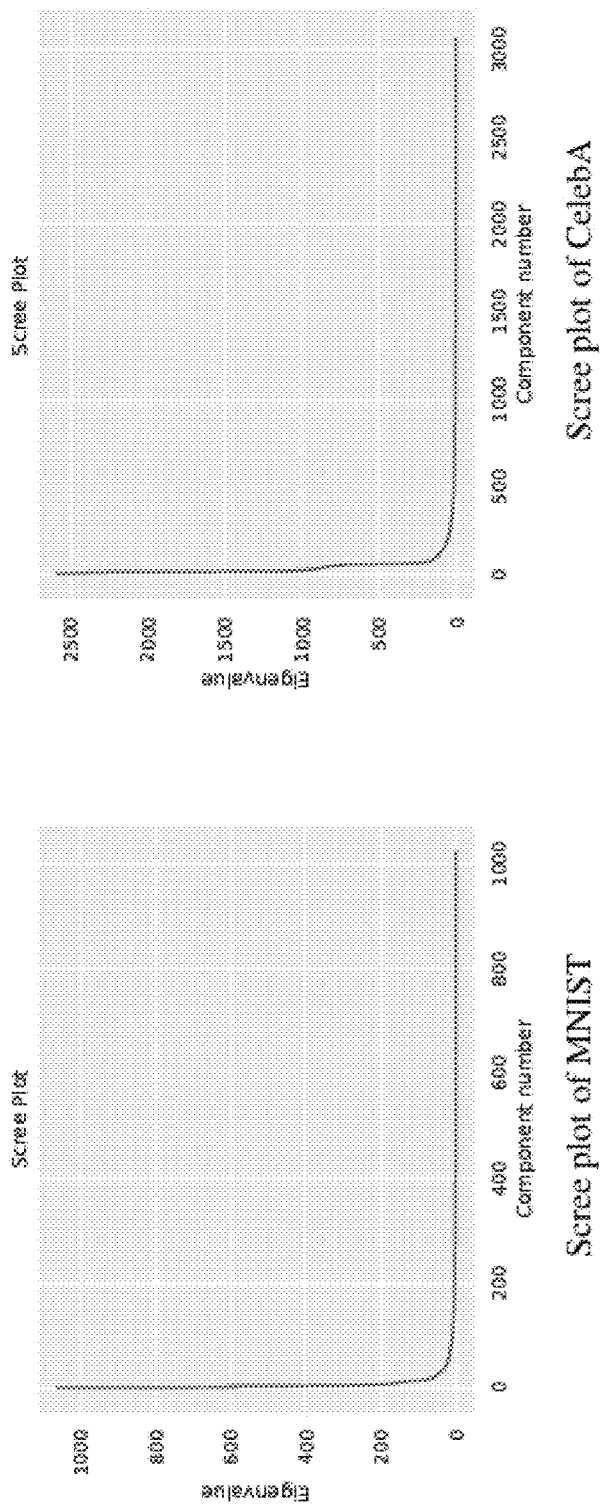
FIGS. 5A and 5B are Scree plots. Most of the eigenvalues are close to 0.

SVD on the resulting matrix reveals the eigenvalues of M, which are reported in FIG. 5.

Proof of Theorem 1

Theorem 1. Let $$d_{max}(\phi) = \max_{x \sim P_D} |\phi^T x|, \quad \sigma^2(\phi) = \sum_{i,j} \sigma_{i,j}^2 \phi_{(i)}^2 \phi_{(j)}^2,$$

and $\delta_d$ be a positive number greater than $$\exp\left(-\frac{1}{2}\left(\frac{\phi^T M \phi}{\sigma(\phi)}\right)^2\right).$$

For the realistic case and for a given key $\phi \in \Omega$, if $$\|\Delta x(\phi)\| \geq \frac{d_{max}(\theta)\sqrt{\phi^T M^2 \phi}}{\phi^T M \phi - \sigma(\phi)\sqrt{\log\left(\frac{1}{\delta_d^2}\right)}} \quad (16)$$

$$D(G_\phi) \geq 1 - \delta_d/2.$$

Proof. We first note that due to data compliance of keys, $\mathbb{E}_{x \sim P_D}[\mathbb{1}(\phi^T x < 0)] = 1$. Therefore $$D(G_\phi) \geq 1 - \delta_d/2 \,\text{iff}\, \mathbb{E}_{x \sim P_{G_\phi}}[\mathbb{1}(\phi^T x > 0)] \geq 1 - \delta_d,$$

i.e., $$1 Pr(\phi^T x > 0) \geq 1 - \delta_d, x \sim P_{G_\phi}.$$

We now seek a key-dependent lower bound on $\varepsilon$ to satisfy this inequality. We first connect generation quality to the step size (learning rate) $\gamma$ following the linear approximation:

$$\|\Delta x(\phi)\| = \|\gamma M \phi\| = \gamma \sqrt{\phi^T M^2 \phi}. \quad (17)$$

Next, given $\varphi$, we look for a sufficiently large $\gamma$, so that $\phi^T x > 0$ with probability at least $1 - \delta_d$. To do so, let x and $x_0$ be sampled from $P_{G_\phi}$ and $P_{G_0}$, respectively. Then with first order approximations we have $$\phi^T x = \phi^T \left(x_0 + \gamma J(x_0) \mathbb{E}_{x \sim P_{G_0}}[J(x)^T] \phi\right) \quad (18)$$

$$= \phi^T x_0 + \gamma \phi^T M \phi + \gamma \phi^T \sum \phi.$$

For $Pr(\phi^T x \geq 0) \geq 1 - \delta_d$, $\gamma$ should satisfy $$Pr\left(\phi^T \sum \phi > -\phi^T x_0/\gamma - \phi^T M \phi\right) \geq 1 - \delta_d. \quad (19)$$

Since $d_{max}(\phi) \geq -\phi^T x_0$; it is sufficient to have $$Pr\left(\phi^T \sum \phi > d_{max}(\phi)/Y - \phi^T M \phi\right) \geq 1 - \delta_d. \quad (20)$$

From Conjecture 1, $$\phi^T \sum \phi \sim N(0, \sigma^2(\phi)).$$

Due to the symmetry of $p(\phi^T \Sigma \phi)$, the sufficient condition for $\gamma$ in Eq. (20) can be rewritten as $$Pr\left(\phi^T \sum \phi \leq \phi^T M \phi - d_{max}(\phi)/\gamma\right) \geq 1 - \delta_d. \quad (21)$$

Recall the following tail bound of $x \sim \mathcal{N}(0, \sigma^2)$ for $y \geq 0$:

$$Pr(x \leq \sigma y) \geq 1 - \exp(-y^2/2). \quad (22)$$

Compare Eq. (22) with Eq. (21), the sufficient condition becomes $$\phi^T M \phi - d_{max}(\phi)/\gamma \geq \sigma(\phi)\sqrt{\log\left(\frac{1}{\delta_d^2}\right)} \Rightarrow \gamma \geq \frac{d_{max}(\phi)}{\phi^T M \phi - \sigma(\phi)\sqrt{\log\left(\frac{1}{\delta_d^2}\right)}} \quad (23)$$

Using Eq. (17), we have $$\|\Delta x(\phi)\| \geq \frac{d_{max}(\phi)\sqrt{\phi^T M^2 \phi}}{\phi^T M \phi - \sigma(\phi)\sqrt{\log\left(\frac{1}{\delta_d^2}\right)}}, \quad (24)$$

provided that $$\phi^T M \phi - \sigma(\phi)\sqrt{\log\left(\frac{1}{\delta_d^2}\right)} > 0 \text{ or} \quad (25)$$

$$\delta_d > \exp\left(-\frac{1}{2}\left(\frac{\phi^T M \phi}{\sigma(\phi)}\right)^2\right).$$

Empirical Test for Conjecture 3

Conjecture 3. $\|\Delta x\| \leq \tau d_{max}$.

The conjecture comes from the following approximations: First, from Conjecture 1, we observe that $\{\sigma_{ij}\}^2$ are small. Using the proof of Theorem 1, a sufficient degradation of generation quality can be approximated by $$\|\Delta x(\phi)\| \approx \frac{d_{max}(\phi)\sqrt{\phi^T M^2 \phi}}{\phi^T M \phi} = \frac{d_{max}\sqrt{c^T \Lambda^2 c}}{c^T \Lambda c}, \quad (26)$$

where $c = P^T \phi$ and $M = P \Lambda P^T$. From Lemma 1, $$\frac{\sqrt{c^T \Lambda^2 c}}{c^T \Lambda c} \in \left[1, \frac{1 + \lambda_{max}/\lambda_{min}}{2\sqrt{\lambda_{max}/\lambda_{min}}}\right]. \quad (27)$$

Let $$\tau = \frac{1 + \lambda_{max}/\lambda_{min}}{2\sqrt{\lambda_{max}/\lambda_{min}}}, \quad (28)$$

then $\|\Delta x\| \leq \tau d_{max}$.

17

Useful Lemmas

Lemma 1 is used for Conjecture 3 and Lemmas 2 for the proof of Theorem 2.

Lemma 1. Let $c \in \mathbb{R}^n$ and $\|c\|=1$, $\Lambda=\text{diag}(\lambda_1 \ldots \lambda_n)$ be positive definite. Then $$\frac{\sqrt{c^T \Lambda^2 c}}{c^T \Lambda c} \in \left[1, \frac{1+\lambda_{max}/\lambda_{min}}{2\sqrt{\lambda_{max}/\lambda_{min}}}\right]. \tag{29}$$

Proof. Let $x =: [c_1^2 \ldots c_n^2]$, $a = [\lambda_1^2 \ldots \lambda_n^2]$, and $b = [\lambda_1 \ldots \lambda_n]$. Then $c^T \Lambda^2 c = a^T x$ and $c^T \Lambda c = b^T x$.

We now consider the following problem:

$$\max_x \frac{1}{2} \log a^T x - \log b^T x \tag{30}$$

$$\text{s.t. } 1^T x = 1$$

$$x_i \geq 0, \forall i.$$

The KKT conditions for this problem are $$-\frac{1}{2a^T x} a + \frac{1}{b^T x} b + \lambda 1 - \mu = 0. \tag{31}$$

$$1^T x - 1$$

$$x_t \geq 0. \ \mu_t \geq 0. \forall i$$

$$\mu^T x - 0.$$

where $\lambda$ and $\mu$ are the Lagrangian multipliers.

When b has unique elements, there exist two sets of KKT points: x is either one-hot, or x has zero entries except for elements i and j where $x_i = b_j/(b_i+b_j)$ and $x_j = b_i/(b_i+b_j)$, for all (i,j) combinations. If b has repeated elements, then we can combine these elements and reach the same conclusion.

When x is one-hot, the objective is $\log a_i/2 - \log b_i = 0$. For the second type of solutions and let $\tau_{ij} = \lambda_i/\lambda_j$, we have $$\frac{1}{2} \log a^T x - \log b^T x = \frac{1}{2} \log \frac{a_i b_j + a_j b_i}{b_i + b_j} - \log \frac{2 b_i b_j}{b_i + b_j} \tag{32}$$

$$= \frac{1}{2} \log \lambda_i \lambda_j - \log \frac{2 \lambda_i \lambda_j}{\lambda_i + \lambda_j}$$

$$= \log \frac{1 + \tau_{ij}}{2\sqrt{\tau_{ij}}} \geq 0.$$

where equality holds when $\tau_{ij} = 1$. Since the objective monotonically increases with respect to $\tau_{ij} > 1$, the maximum is reached when $\tau_{ij} = \lambda_{max}/\lambda_{min}$.

Lemma 2. Let $a, b \in \mathbb{R}^n$, $\|a\|=1$, $\|b\|=1$, and $a^T b \leq 0$. Let $V \in \mathbb{R}^{n \times n}$. Then $$\max_a \{a^T V b\} = \sqrt{b^T y^T V b - (b^T V b)^2}.$$

18

Proof. Consider the following problem $$\min_a \ -a^T V b \tag{33}$$

$$\text{s.t.} \ \begin{array}{l} a^T b \leq 0 \\ a^T a = 1. \end{array}$$

with the following KKT conditions:

$$-Vb + \mu b + 2\lambda a = 0$$

$$a^T b \leq 0$$

$$a^T a = 1. \tag{34}$$

The solution is $$\lambda = a^T V b / 2 \tag{35}$$

$$\mu = b^T V b$$

$$a = \frac{(V - b^T V b I) b}{\sqrt{b^T V^T V b - (b^T V b)^2}}.$$

Note that $$\|(V - b^T V b I) b I\|^2 = b^T (V^T - b^T V b I)(V - b^T V b I) b \tag{36}$$

$$= b^T V^T V b - (b^T V b)^2,$$

thus $b^T V^T V b - (b^T V b)^2 \geq 0$.

Since the Hessian of the Lagrangian with respect to a is $2\lambda I$, and from the solution $$\lambda = a^T V b / 2 \tag{37}$$

$$= \sqrt{b^T V^T V b - (b^T V b)^2} / 2 \geq 0.$$

therefore the solution is the minimizer, i.e., $$\max_a \{a^T V b\} = \sqrt{b^T y^T V b - (b^T V b)^2}.$$

Proof of Theorem 2

Theorem 2. Let $$d^*_{min} = \min_{\phi \in \Phi, x \sim P_D} |\phi^T x|, \ \sigma^2(\phi) = \sqrt{\phi^T V^T \phi - (\phi^T V \phi)^2},$$

and $V_{(i,j)} = \sigma_{ij}^2$. When $D(G) \geq 1 - \delta_d$ for all $G_\phi \in \mathcal{G}$, if the degradation of generation quality for all models in $\mathcal{G}$ satisfies $$\|\Delta x(\phi)\| \leq \frac{d^*_{min} \sqrt{\phi^T M^2 \phi}}{\sqrt{\phi^T M^2 \phi - (\phi^T M \phi)^2} + \sigma(\phi) \sqrt{\log \frac{1}{\delta_a^2}}}, \tag{38}$$

and $\phi^T \phi' \leq 0$ for all $\phi, \phi' \in \Omega$, then $A(\mathcal{G}) \geq 1 - (\delta_d + \delta_a)/2$.

Proof. Let $\phi$ and $\phi'$ be any of the two orthogonal keys, and $x'$ and $x_0$ be sampled from $P_{G_{\phi'}}$ and $P_{G_0}$, respectively. $A(\mathcal{G}) \geq 1-(\delta_d+\delta_a)/2$ and $D(G) \geq 1-\delta_d$, for all $G \in \mathcal{G}$ together imply that $\Pr(\phi^T x' < 0) \geq 1-\delta_a$. Now we focus on deriving the sufficient conditions for this inequality. From first order approximations, $$\phi^T x' = \phi^T \left( x_0 + \gamma(\phi') J(x_0) \mathbb{E}_{x \sim P_{G(\theta_0)}} [J(x)^T] \phi' \right) \qquad (39)$$
$$= \phi^T x_a + \gamma(\phi') \phi^T M \phi' + \gamma(\phi') \phi^T \sum \phi'.$$

Therefore $$\Pr(\phi^T x' < 0) = \Pr\left(\phi^T \sum \phi' < -\phi^T x_0/\gamma(\phi') - \phi^T M \phi'\right) \qquad (40)$$
$$\geq \Pr\left(\phi^T \sum \phi' < d_{min}(\phi)/\gamma(\phi') - \phi^T M \phi'\right).$$

Note that the RHS of Eq. (40) suggests that $\gamma(\phi')$ needs to be sufficiently small for $\Pr(\phi^T x' < 0)$ to be large. To see where that upper bound is, we start by noting that $$\phi^T \sum \phi'$$

has zero mean and is normally distributed. To analyze its variance, we use Lemma 2 to show that $$\mathrm{Var}\left(\phi^T \sum \phi'\right) \leq \sigma^2(\phi^i) = \sqrt{\phi^T V^T V \phi' - (\phi'^T V \phi')^2}, \qquad (41)$$

where $V_{(i,j)} = \sigma_{ij}^2$,

Using the same tail bound of normal distribution as in Theorem 1, $\gamma(\phi')$ is sufficient small if $$d_{min}(\phi)/\gamma(\phi') \; \phi^T M \phi' \geq \overline{\sigma}(\phi') \sqrt{\log\left(\frac{1}{\delta_a^2}\right)} \Rightarrow \qquad (42)$$

$$\gamma(\phi') \leq \begin{cases} \dfrac{d_{min}(\phi)}{\phi^T M \phi' \cdot \sigma(\phi') \sqrt{\log\left(\frac{1}{\delta_a^2}\right)}} & \text{if } \phi^T M \phi' + \sigma(\phi') \sqrt{\log\left(\frac{1}{\delta_a^2}\right)} > 0. \\ +\infty & \text{otherwise} \end{cases}$$

Since $\|\Delta x(\phi')\| = \gamma(\phi') \sqrt{\phi'^T M^2 \phi'}$, we have $$\|\Delta x(\phi')\| \leq \qquad (43)$$
$$\begin{cases} \dfrac{d_{min} \lambda r + 1 \sqrt{\phi'^T M^2 cl}}{\phi^T M \phi' + \sigma(\phi') \sqrt{\log\left(\frac{\delta}{n}\right)}} & \text{if } \phi^T M \phi' - \sigma(\phi') \sqrt{\log\left(\frac{1}{\delta_a^2}\right)} > 0. \\ +\infty & \text{otherwise} \end{cases}$$

We would like to find a lower bound of the RHS of Eq. (43) that is independent of $\phi \neq \phi'$. To this end, first denote $d^*_{min} = \min_\phi d_m(\phi)$. Now use Lemma 2 again to derive an upper bound of $\phi^T M \phi'$:

$$\phi^T M \phi' \leq \sqrt{\phi'^T M^2 \phi' - (\phi'^T M \phi')^2}. \qquad (44)$$

Replace $\phi^T M \phi'$ in Eq. (43) with its upper bound to reach a $\phi$-independent sufficient condition for $\|\Delta x(\phi')\|$:

$$|\Delta x(\phi')| < \dfrac{d^*_{min} \sqrt{\phi'^T M^2 \phi'}}{\sqrt{\phi'^T M^2 \phi' - (\phi'^T M \phi')^2} - \sigma(\phi') \sqrt{\log\left(\frac{1}{\delta_a^2}\right)}}. \qquad (45)$$

Limited Capacity of Keys

Figure 6B:
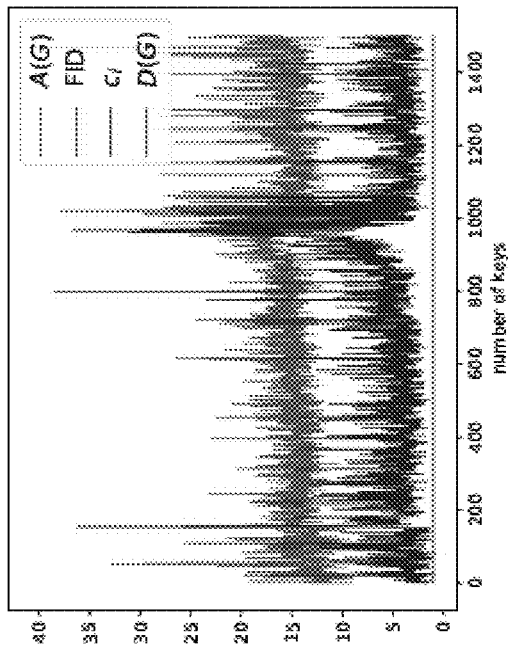
FIGS. 6A and 6B are respective graphical representation showing: (a) $d_{max}$ is bounded by $\|\Delta_x\|$ and $o_i$ is close to 0; and (b) $o_i$ and FID show positive correlation (0.63). Also, $D(G_\phi)$ and $A(\{G_{\phi_j}\}_{x-1}^i)$ are close to 1.
Figure 6A:
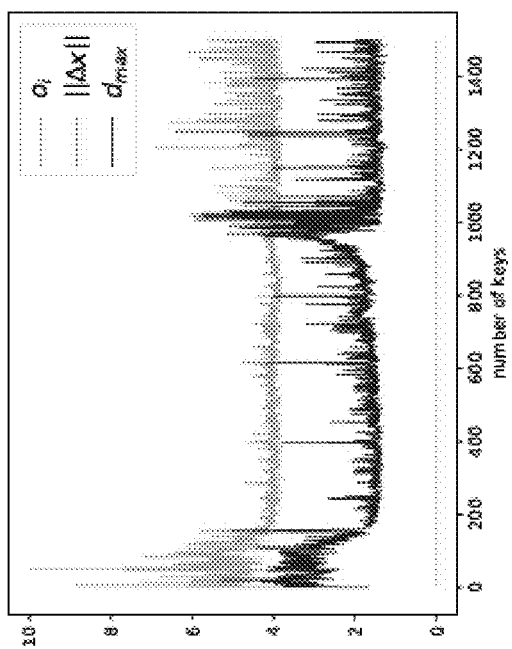

We generate 1500 keys for MNIST: orthogonality $$o_i = \sum_{j=1}^{i-1} |\phi_j^T \phi_i| / (i-1)(o_1 = 0),$$

key-perturbation correlation $c_i = \phi_i^T M \phi_i$, $d_{max}(\phi_i)$, distinguishability $D(G_{\phi_i})$, attributability $A(\{G_{\phi_i}\}_{j=1}^i)$, lack of generation quality $\|\Delta x\|$ and FID for $i=1 \ldots 1500$. Some remarks: (1) $d_{max}$ is bounded and so is $\|\Delta x\|$ (FIG. 6A). (2) Larger $c_i$ indicates more involvement of the key in the eigenspace of M with large eigenvalues. There is a positive correlation (0.63) between c and the FID scores, as expected (FIG. 6B). (3) Nearly orthogonal keys abound due to the high-dimensionality of the output space, for which decentralized attribution is achieved (FIG. 6B). Thus, the results suggest that the registry can use c and $d_{max}$ to monitor the generation quality.

Figure 7B:
FIGS. 7A and 7B are graphical representations showing: (a) Largest eigenvectors of the first layer to last layer (top to bottom) and corresponding samples (cosine similarities with largest eigenvector of M are −0.49, 0.20, −0.98, 0.49); and (b) Largest eigenvectors of the first layer to the last layer (top to bottom) and corresponding samples (cosine similarities with largest eigenvector of M are 0, 0.01, −0.05, and −0.5).
Figure 7A:
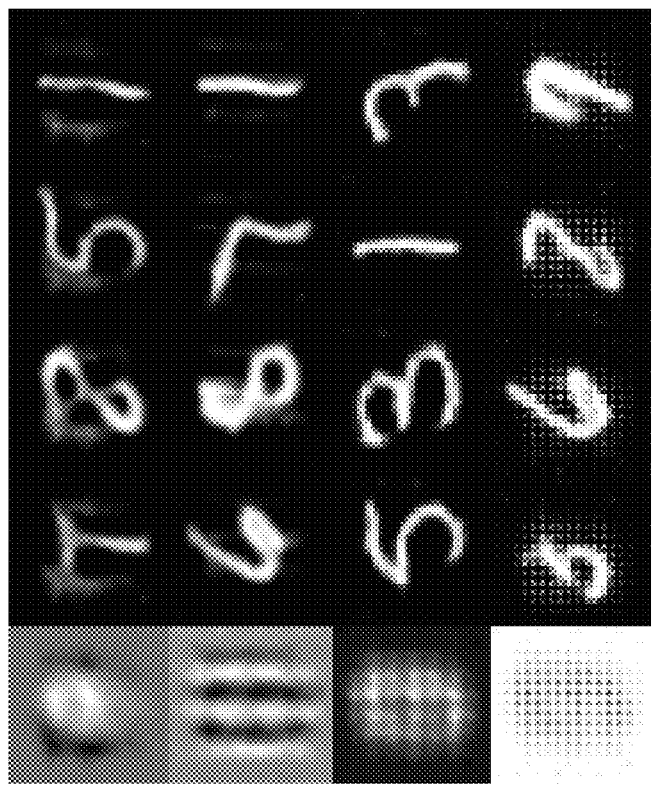
Figure 8A:
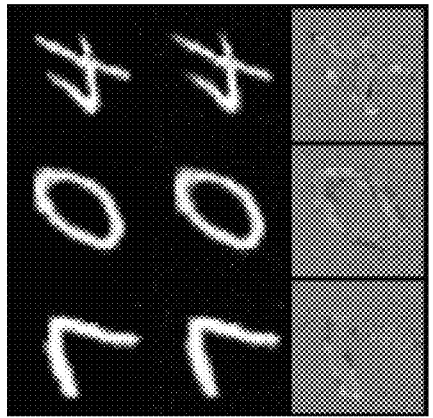
FIGS. 8A-8F are a series of images showing DCGAN-MNIST.
Figure 8B:
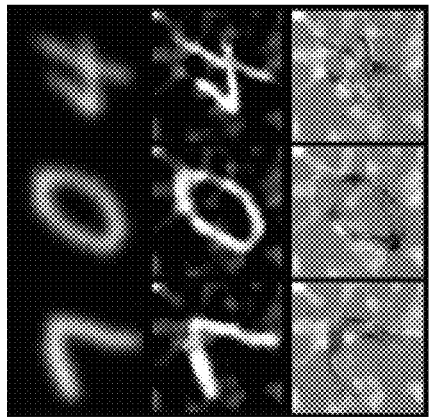
Figure 8C:
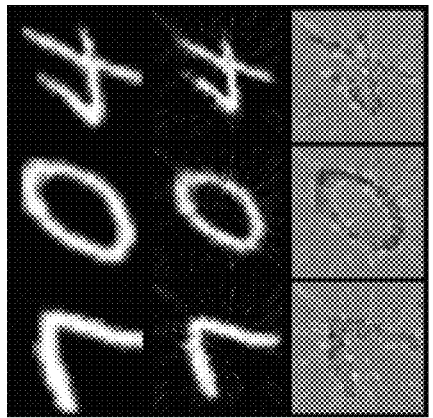
Figure 8D:
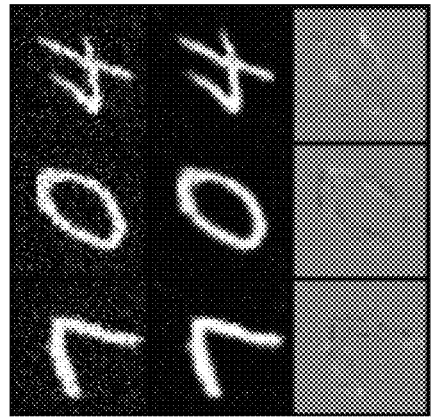
Figure 8E:
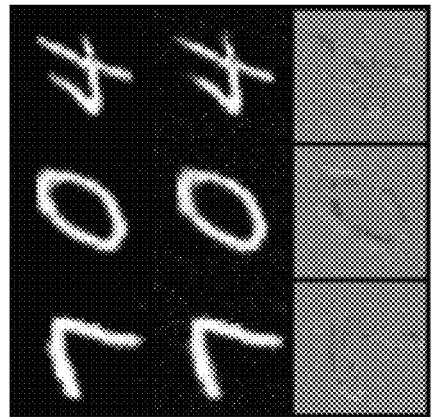
Figure 8F:
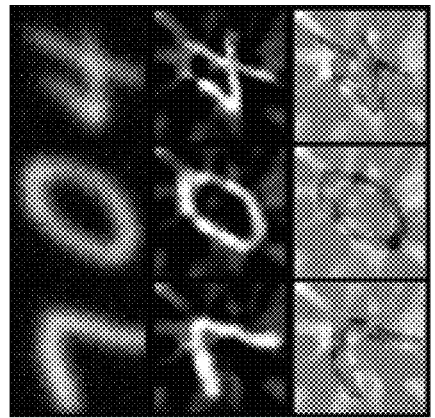

Approximation of M: The hypothesis is that the structured pattern of large eigenvectors is associated with eigenvectors of the later layers of the generators. Therefore, M can be approximated using the Jacobian of these layers. For empirical experiments, we train four-layer DCGANs for MNIST and CelebA, and compute the cosine similarities between the largest eigenvector of M and the largest eigenvectors of Jacobian of each of layers. Results are presented in FIGS. 7A and 7B with visual examples. Also, it is viable to approximate the largest eigenvectors with the last layers.

Examples of GANs

In the paper, we show examples from PGAN with CelebA. Here, we illustrate other GANs examples. For FIGS. 8A-8F, 9A-9F, and 10A-10F, (a) 1st-2rd row: authentic data, samples from the non-robust generator (b-f) 1st-2rd rows: worst-case post-process, samples from robust training against the specific post-processes (before the post-processes). 3rd row for all: numerical differences between 2nd row of (a) and 2nd row of each case. Thus, the differences show the effect of robust training on attribution.

Training Details

K.1 Parameters

We adopt Adam optimizer for gradient descent. We attach other parameters in Table 4. Note that we fix the hyperparameters when we optimize Eq. (Robust training) in Implementation.

K.2 Training Time

For experimental validations, we use V:100 Tesla GPUs. Exact number of GPUs are reported in Table 5.

TABLE 4

Hyper-parameters for training Eq. (Key generation) (top) and Eq. (Generative models) (btm). Equations are in Implementation.

| GANs | Dataset | Batch Size | Learning Rate | $\beta_1$ | $\beta_2$ | Epochs | C |
|---|---|---|---|---|---|---|---|
| DCGAN | MNIST | 128 | 0.001 | 0.5 | 0.99 | 10 | — |
| DCGAN | CelebA | 64 | 0.001 | 0.5 | 0.99 | 10 | — |
| PGAN | CelebA | 32 | 0.001 | 0.5 | 0.99 | 10 | — |
| CycleGAN | Cityscapes | 4 | 0.001 | 0.5 | 0.99 | 20 | — |
| DCGAN | MNIST | 16 | 0.0005 | 0.5 | 0.99 | 10 | 10 |
| DCGAN | CelebA | 64 | 0.0005 | 0.5 | 0.99 | 10 | 10 |
| PGAN | CelebA | 16 | 0.0005 | 0.0 | 0.99 | 5 | 100 |
| CycleGAN | Cityscapes | 1 | 0.0005 | 0.5 | 0.99 | 5 | 1000 |

TABLE 5

Training time (in minute) of one key (Eq. (Key generation)) and one generator (Eq. (Generative models)). DCGAN-M: DCGAN for MNIST, DCGAN-C: DCGAN for CelebA. Equations are in Implementation.

| GANs | CPUs | Key | Naive | Blurring | Cropping | Noise | JPEG | Combination |
|---|---|---|---|---|---|---|---|---|
| DCGAN-M | 1 | 1.77 | 8.52 | 4.12 | 3.96 | 4.19 | 5.71 | 5.12 |
| DCGAN-C | 1 | 5.31 | 9.12 | 10.33 | 9.56 | 10.35 | 10.25 | 10.76 |
| PGAN | 2 | 50.89 | 141.07 | 140.05 | 131.90 | 133.46 | 132.46 | 135.07 |
| CycleGAN | 1 | 20.88 | 16.04 | 16.26 | 15.43 | 15.71 | 15.98 | 16.41 |

Ablation Study

We attach the table of ablation study of how C affects the result of distinguishability, attributability, $\|\Delta x\|$ and FID scores in Table 6. C does not affect to the distinguishability and attributability. But C improves $\|\Delta x\|$ and FID for every generators. Furthermore, we investigate how C term affects the robustness in Table 7 and Table 8. We can observe that, as C increases, robustness decreases but generation quality increases.

TABLE 6

Empirical averaged distinguishability ($\overline{D}$), attributability ($A(\mathcal{G})$). $\|\Delta.r\|$ and FID scores. Standard deviations reported when applicable, or omitted if ≤0.05. FID of $G_0$. ($FID_0$) is the baseline. FID is not applicable to CycleGAN.

| GANs | Dataset | C | D | $A(\mathcal{G})$ | $\|\Delta.r\|$ | $FID_0$ | FID |
|---|---|---|---|---|---|---|---|
| DCGAN | MNIST | 10 | 0.99 | 0.99 | 5.20(0.31) | 4.98(0.15) | 5.68(0.23) |
| DCGAN | MNIST | 100 | 0.99 | 0.99 | 4.09(0.53) | — | 5.32(0.11) |
| DCGAN | MNIST | 1K | 0.99 | 0.99 | 3.88(0.60) | — | 5.23(0.12) |
| DCGAN | CelebA | 10 | 0.99 | 0.99 | 4.19(0.18) | 33.95(0.13) | 52.09(2.20) |
| DCGAN | CelebA | 100 | 0.99 | 0.99 | 3.08(0.27) | — | 45.02(3.37) |
| DCGAN | CelebA | 1K | 0.99 | 0.99 | 2.55(0.36) | — | 40.85(3.41) |
| PGAN | CelebA | 100 | 0.99 | 0.99 | 9.29(0.95) | 13.31(0.07) | 21.62(1.73) |
| PGAN | CelebA | 1K | 0.99 | 0.99 | 6.51(1.85) | — | 19.05(3.14) |
| PGAN | CelebA | 10K | 0.98 | 0.98 | 5.05(1.63) | — | 16.75(1.87) |
| CycleGAN | Cityscapes | 1K | 0.99 | 0.99 | 55.85(3.67) | — | — |
| CycleGAN | Cityscapes | 10K | 0.99 | 0.99 | 49.66(5.01) | — | — |

TABLE 7

Distinguishabilit (top), attributability (btm) before (Bfr) and after (Aft) robust training. DCGAN-M: DCGAN for MNIST, DCGAN-C: DCGAN for CelebA.

| GANs | C | Blurring | | Cropping | | Noise | | JPEG | | Combination | |
|---|---|---|---|---|---|---|---|---|---|---|---|
| | | Bfr | Aft | Bfr | Aft | Bfr | Aft | Bfr | Aft | Bfr | Aft |
| DCGAN-M | 10 | 0.49 | 0.96 | 0.52 | 0.99 | 0.85 | 0.99 | 0.54 | 0.99 | 0.50 | 0.66 |
| DCGAN-M | 100 | 0.49 | 0.61 | 0.51 | 0.98 | 0.76 | 0.98 | 0.53 | 0.99 | 0.50 | 0.52 |
| DCGAN-M | 1K | 0.49 | 0.50 | 0.51 | 0.81 | 0.69 | 0.91 | 0.53 | 0.97 | 0.50 | 0.51 |
| DCGAN-C | 10 | 0.49 | 0.99 | 0.49 | 0.99 | 0.95 | 0.98 | 0.51 | 0.99 | 0.50 | 0.85 |
| DCGAN-C | 100 | 0.50 | 0.96 | 0.49 | 0.49 | 0.92 | 0.93 | 0.50 | 0.99 | 0.49 | 0.61 |
| DCGAN-C | 1K | 0.50 | 0.62 | 0.49 | 0.97 | 0.88 | 0.91 | 0.50 | 0.99 | 0.49 | 0.51 |
| PGAN | 100 | 0.50 | 0.98 | 0.51 | 0.99 | 0.97 | 0.99 | 0.96 | 0.99 | 0.50 | 0.76 |
| PGAN | 1K | 0.50 | 0.89 | 0.49 | 0.95 | 0.94 | 0.95 | 0.88 | 0.99 | 0.50 | 0.60 |
| PGAN | 10K | 0.50 | 0.61 | 0.50 | 0.76 | 0.89 | 0.90 | 0.76 | 0.98 | 0.50 | 0.51 |
| CycleGAN | 1K | 0.49 | 0.92 | 0.49 | 0.87 | 0.98 | 0.99 | 0.55 | 0.99 | 0.49 | 0.67 |
| CycleGAN | 10K | 0.49 | 0.70 | 0.50 | 0.66 | 0.94 | 0.96 | 0.52 | 0.98 | 0.50 | 0.51 |

TABLE 7-continued

Distinguishabilit (top), attributability (btm) before (Bfr) and after (Aft) robust training.
DCGAN-M: DCGAN for MNIST, DCGAN-C: DCGAN for CelebA.

| GANs | C | Blurring | | Cropping | | Noise | | JPEG | | Combination | |
|---|---|---|---|---|---|---|---|---|---|---|---|
| | | Bfr | Aft | Bfr | Aft | Bfr | Aft | Bfr | Aft | Bfr | Aft |
| DCGAN-M | 10 | 0.49 | 0.96 | 0.49 | 0.97 | 0.85 | 0.98 | 0.53 | 0.99 | 0.49 | 0.65 |
| DCGAN-M | 100 | 0.50 | 0.54 | 0.49 | 0.97 | 0.74 | 0.96 | 0.52 | 0.94 | 0.49 | 0.52 |
| DCGAN-M | 1K | 0.50 | 0.50 | 0.49 | 0.80 | 0.68 | 0.89 | 0.52 | 0.89 | 0.49 | 0.50 |
| DCGAN-C | 10 | 0.50 | 0.99 | 0.50 | 0.99 | 0.95 | 0.99 | 0.51 | 0.99 | 0.50 | 0.85 |
| DCGAN-C | 100 | 0.50 | 0.96 | 0.49 | 0.99 | 0.92 | 0.93 | 0.50 | 0.99 | 0.49 | 0.61 |
| DCGAN-C | 1K | 0.49 | 0.61 | 0.50 | 0.98 | 0.87 | 0.89 | 0.50 | 0.99 | 0.50 | 0.51 |
| PGAN | 100 | 0.50 | 0.97 | 0.50 | 0.99 | 0.96 | 0.98 | 0.96 | 0.99 | 0.50 | 0.76 |
| PGAN | 1K | 0.50 | 0.87 | 0.50 | 0.95 | 0.93 | 0.94 | 0.86 | 0.99 | 0.49 | 0.59 |
| PGAN | 10K | 0.50 | 0.60 | 0.50 | 0.77 | 0.88 | 0.89 | 0.76 | 0.97 | 0.50 | 0.51 |
| CycleGAN | 1K | 0.50 | 0.92 | 0.50 | 0.86 | 0.97 | 0.98 | 0.54 | 0.99 | 0.50 | 0.67 |
| CycleGAN | 10K | 0.50 | 0.70 | 0.50 | 0.66 | 0.92 | 0.94 | 0.52 | 0.98 | 0.49 | 0.51 |

TABLE 8

$\|\Delta.r\|$ (top) and FID score (btm). Standard deviations in parenthesis. DCGAN-M:
DCGAN for MNIST, DCGAN-C: DCGAN for CelebA. FID score not applicable to
CycleGAN. $\|\Delta.r\|$ and FID score in Table 6 are baseline. Lower is better.

| GANs | C | Baseline | Blurring | Cropping | Noise | JPEG | Combination |
|---|---|---|---|---|---|---|---|
| DCGAN-M | 10 | 5.20(0.31) | 15.96(2.18) | 9.17(0.65) | 5.93(0.34) | 6.48(0.94) | 17.08(1.86) |
| DCGAN-M | 100 | 4.09(0.53) | 12.95(4.47) | 7.62(1.55) | 4.57(0.78) | 4.70(1.02) | 12.70(3.37) |
| DCGAN-M | 1K | 3.88(0.60) | 7.17(2.10) | 7.43(1.37) | 4.22(0.77) | 5.12(1.94) | 7.56(1.41) |
| DCGAN-C | 10 | 4.19(0.18) | 11.83(0.65) | 9.30(0.31) | 4.75(0.17) | 6.01(0.29) | 13.69(0.59) |
| DCGAN-C | 100 | 3.08(0.27) | 10.00(1.61) | 7.80(0.58) | 3.20(0.45) | 4.26(0.59) | 11.65(1.48) |
| DCGAN-C | 1K | 2.55(0.36) | 7.68(1.53) | 7.13(0.47) | 2.65(0.24) | 3.39(0.58) | 9.23(1.22) |
| PGAN | 100 | 9.29(0.95) | 18.49(2.04) | 21.27(0.81) | 10.20(0.81) | 10.08(1.03) | 24.82(2.33) |
| PGAN | 1K | 6.52(1.85) | 14.79(4.15) | 18.88(1.96) | 6.40(1.48) | 7.09(1.62) | 22.09(2.12) |
| PGAN | 10K | 5.04(1.63) | 10.19(2.87) | 18.23(0.94) | 5.13(1.14) | 5.67(1.62) | 17.26(1.39) |
| CycleGAN | 1K | 55.85(3.67) | 68.03(3.62) | 80.03(3.59) | 55.47(1.60) | 57.42(2.00) | 83.94(4.66) |
| CycleGAN | 10K | 49.66(5.01) | 58.64(3.70) | 66.05(3.47) | 53.14(0.44) | 54.52(2.30) | 66.24(5.29) |
| DCGAN-M | 10 | 5.68(0.23) | 41.11(20.43) | 21.58(2.44) | 5.79(0.19) | 6.50(1.70) | 68.16(24.67) |
| DCGAN-M | 100 | 5.32(0.11) | 23.83(14.29) | 18.39(3.70) | 5.41(0.18) | 5.46(0.11) | 36.05(16.20) |
| DCGAN-M | 1K | 5.23(0.12) | 10.85(4.28) | 18.08(1.77) | 5.37(0.14) | 5.30(0.96) | 21.86(4.16) |
| DCGAN-C | 10 | 52.09(2.20) | 73.62(6.70) | 98.86(9.51) | 59.51(1.60) | 60.35(2.57) | 87.29(9.29) |
| DCGAN-C | 100 | 45.02(3.37) | 73.12(11.03) | 85.50(12.25) | 47.60(2.57) | 50.48(4.58) | 78.11(12.95) |
| DCGAN-C | 1K | 40.85(3.41) | 55.63(7.97) | 72.11(13.81) | 40.87(3.03) | 45.46(5.03) | 57.13(7.20) |
| PGAN | 100 | 21.62(1.73) | 28.15(3.43) | 47.94(5.71) | 25.43(2.19) | 22.86(2.06) | 45.16(7.87) |
| PGAN | 1K | 19.05(3.14) | 25.19(5.26) | 43.48(12.24) | 19.20(2.96) | 19.05(2.82) | 35.07(8.72) |
| PGAN | 10K | 16.75(1.87) | 18.96(2.65) | 37.01(8.74) | 16.94(1.89) | 17.39(2.33) | 26.63(4.44) |

Figure 11:
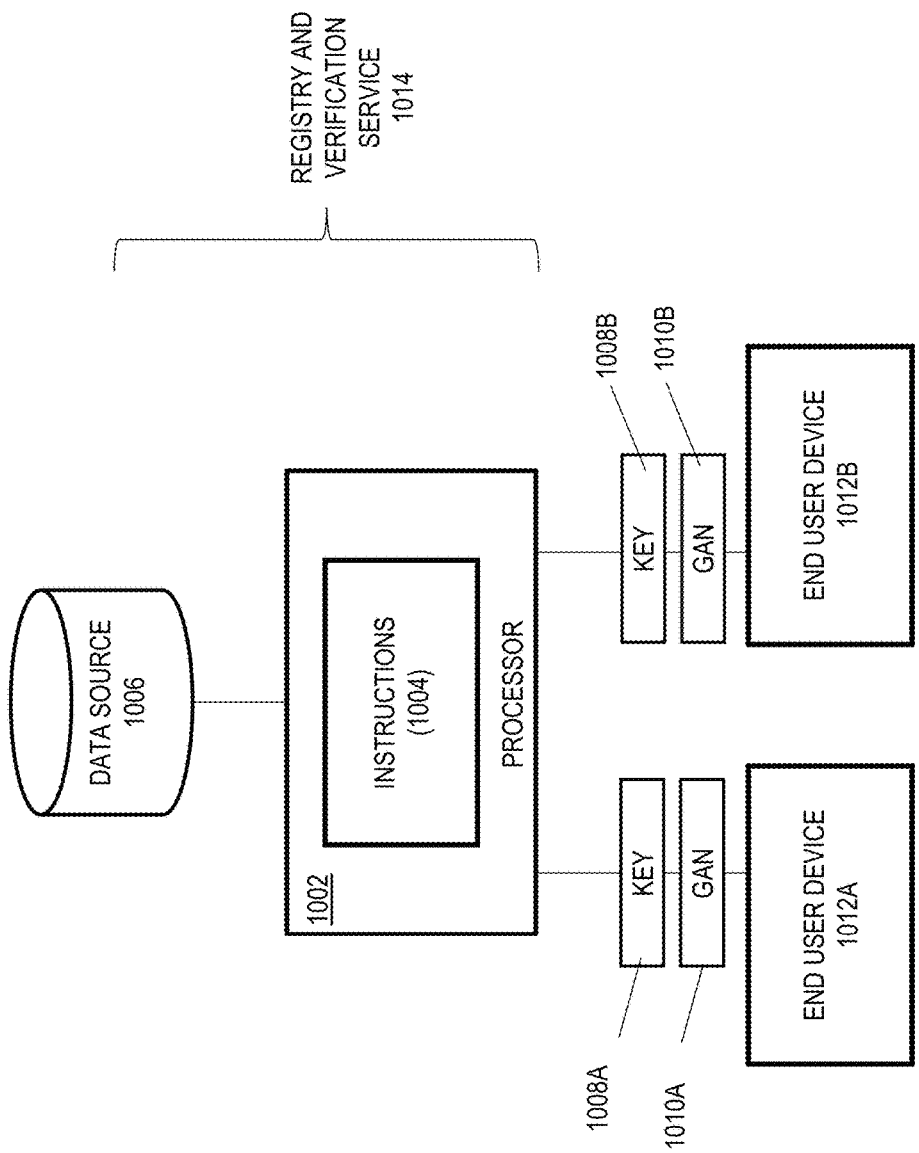
FIG. 11 is a simplified block diagram of a computer-implemented system associated with the decentralized attribution of generative models concepts described herein.

Referring to FIG. 11, a computer-implemented system (system) 1000 is shown including a processor 1002 configured with instructions 1004 for performing the attribution functionality described herein. In some embodiments, the processor 1002 is in operable communication with a data source 1006 that provides one or more datasets for generative models. As indicated, the processor 1002 is configured, via the instructions 1004, to provide a GAN 1008 and at least one key 1010 to each of a plurality of end user devices 1012; e.g., the end user devices 112 may download the GAN 1008 and a key 1010 via an application or app (e.g., app 1211 in FIG. 13). In some embodiments, the instructions 1004 may be implemented as code and/or machine-executable instructions executable by the processor 1002 that may represent one or more of a procedure, a function, a subprogram, a program, a routine, a subroutine, a module, an object, a software package, a class, or any combination of instructions, data structures, or program statements, and the like. In other words, the instructions 1004 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium (e.g., the memory 1204 of FIG. 13), and the processor 1002 performs the tasks defined by the code. In some embodiments, the processor 1002 as configured, in combination with the data source 1006, collectively forms a registry and verification service 1014, and the processor 1002 as configured by the instructions 1004 can identify whether a query belongs to a particular GAN 1008. In general, as described, installation of the GANs 1008 to the end user devices 1012 as described modifies the GAN 1008 according to the keys 1010 so that each resulting model can be verified.

Figure 12:
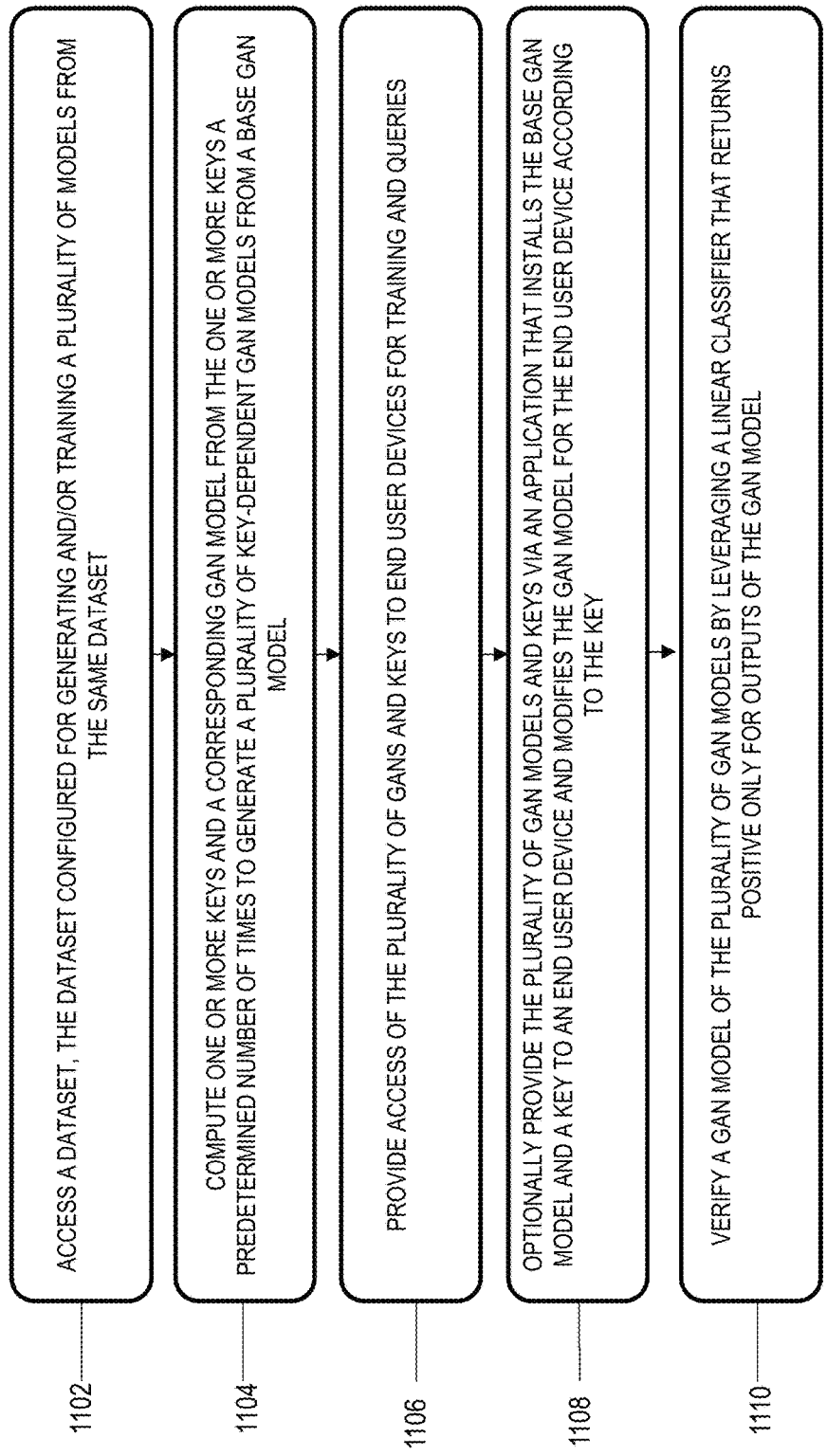
FIG. 12 is a simplified block diagram of an exemplary process associated with the decentralized attribution of generative models concepts described herein.

Referring to FIG. 12, an exemplary process 1100 is shown for exemplifying attribution concepts described herein. Referring to blocks 1102 and 1104, a processor (e.g., 1002) accesses a dataset and a base GAN model, and computes a plurality of keys. One or more keys may be used to further compute a key-dependent GAN model from the base GAN model. In blocks 1106 and 1108, the a plurality of such key-dependent models can be computed and each may be provided to users of end user devices so that each user trains a different, verifiable, key-dependent model.

As indicated in block 1110, each key-dependent GAN model can be verified or attributed by, e.g., leveraging a linear classifier that returns positive only for outputs of the respective model. In other words, each key-dependent model is parameterized by keys (distributed by a registry or otherwise). The keys may be computed from first-order sufficient conditions for decentralized attribution. The keys may further be orthogonal or opposite to each other and belong to a subspace dependent on the data distribution and the architecture of the generative model.

Figure 13:
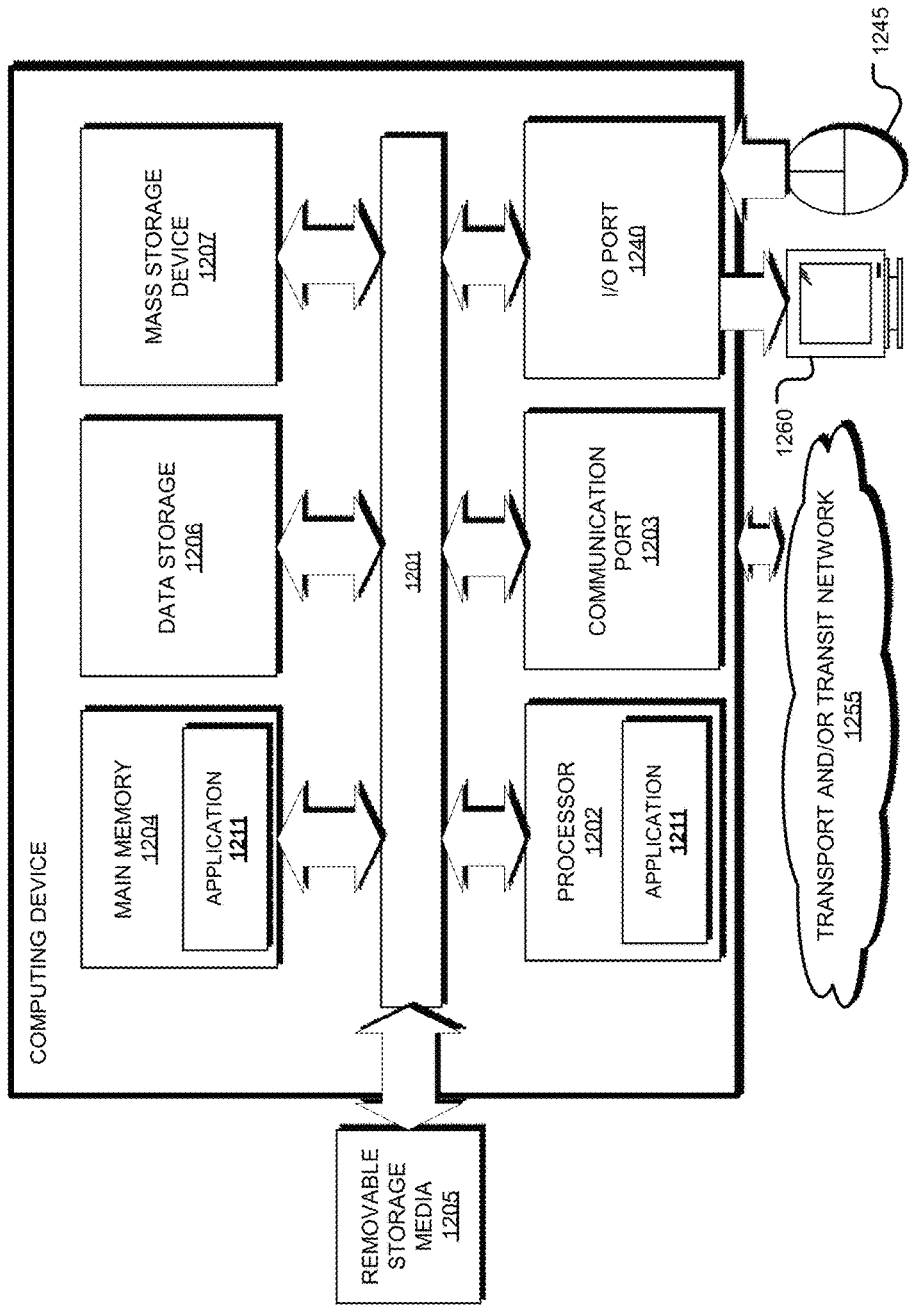
FIG. 13 is an exemplary simplified block diagram of a computing device that may be configured to implement various methodologies described herein.

Exemplary Computing Device:

Referring to FIG. 13, a computing device 1200 is illustrated which may be configured, via one or more of an application 1211 or computer-executable instructions, to execute functionality described herein. More particularly, in some embodiments, aspects of the attribution methods and functions herein may be translated to software or machine-level code, which may be installed to and/or executed by the computing device 1200 such that the computing device 1200 is configured to execute functionality described herein. It is contemplated that the computing device 1200 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 1200 may include various hardware components, such as a processor 1202, a main memory 1204 (e.g., a system memory), and a system bus 1201 that couples various components of the computing device 1200 to the processor 1202. The system bus 1201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 1200 may further include a variety of memory devices and computer-readable media 1207 that includes removable/non-removable media and volatile/non-volatile media and/or tangible media, but excludes transitory propagated signals. Computer-readable media 1207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 1200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 1204 includes computer storage media in the form of volatile/nonvolatile memory such as read only memory (ROM) and random access memory (RAM). A basic input/output system (BIOS), containing the basic routines that help to transfer information between elements within the computing device 1200 (e.g., during start-up) is typically stored in ROM. RAM typically contains data and/or program modules that are immediately accessible to and/or presently being operated on by processor 1202. Further, data storage 1206 in the form of Read-Only Memory (ROM) or otherwise may store an operating system, application programs, and other program modules and program data.

The data storage 1206 may also include other removable/non-removable, volatile/nonvolatile computer storage media. For example, the data storage 1206 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 1200.

A user may enter commands and information through a user interface 1240 (displayed via a monitor 1260) by engaging input devices 1245 such as a tablet, electronic digitizer, a microphone, keyboard, and/or pointing device, commonly referred to as mouse, trackball or touch pad. Other input devices 1245 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 1245 are in operative connection to the processor 1202 and may be coupled to the system bus 1201, but may be connected by other interface and bus structures, such as a parallel port, game port or a universal serial bus (USB). The monitor 1260 or other type of display device may also be connected to the system bus 1201. The monitor 1260 may also be integrated with a touch-screen panel or the like.

The computing device 1200 may be implemented in a networked or cloud-computing environment using logical connections of a network interface 1203 to one or more remote devices, such as a remote computer. The remote computer may be a personal computer, a server, a router, a network PC, a peer device or other common network node, and typically includes many or all of the elements described above relative to the computing device 1200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 1200 may be connected to a public and/or private network through the network interface

1203. In such embodiments, a modem or other means for establishing communications over the network is connected to the system bus 1201 via the network interface 1203 or other appropriate mechanism. A wireless networking component including an interface and antenna may be coupled through a suitable device such as an access point or peer computer to a network. In a networked environment, program modules depicted relative to the computing device 1200, or portions thereof, may be stored in the remote memory storage device.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 1202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Computing systems or devices referenced herein may include desktop computers, laptops, tablets e-readers, personal digital assistants, smartphones, gaming devices, servers, and the like. The computing devices may access computer-readable media that include computer-readable storage media and data transmission media. In some embodiments, the computer-readable storage media are tangible storage devices that do not include a transitory propagating signal. Examples include memory such as primary memory, cache memory, and secondary memory (e.g., DVD) and other storage devices. The computer-readable storage media may have instructions recorded on them or may be encoded with computer-executable instructions or logic that implements aspects of the functionality described herein. The data transmission media may be used for transmitting data via transitory, propagating signals or carrier waves (e.g., electromagnetism) via a wired or wireless connection.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for decentralized attribution of generative models, comprising: a processor in communication with a memory, the memory including instructions executable by the processor to:
   generate a key for attributing an output image of a first generative adversarial network (GAN) with a user device, wherein the key is one of a plurality of keys derived from first-order sufficient conditions for decentralized attribution of the key to the first GAN of the user device and distinguishability of the output image from an authentic image;
   transmit, to the user device and over a network, a set of application installation instructions executable at the user device to:
      install an application including a GAN at the user device;
      modify one or more model parameters of the GAN at the user device using the key to produce the first GAN uniquely installed at the user device; and
      removing the key from the user device; and
   apply a classification model to the output image of the first GAN generated at the user device, the output image of the first GAN being influenced by the key and the classification model being trained to detect the output image as being produced by the first GAN associated with the user device by correlating one or more features of the output image with the key.

2. The system of claim 1, wherein the plurality of keys are orthogonal keys that achieve distinguishability and attributability.

3. The system of claim 1, wherein the plurality of keys belong to a subspace dependent upon data distribution and architecture of each GAN.

4. The system of claim 1, wherein the first GAN is one of a plurality of GANs distributed to a plurality of end user devices the plurality of GANS being respectively and uniquely modified using the plurality of keys.

5. A method for decentralized attribution of generative models, comprising:

accessing, by a processor, information associated with a dataset, the dataset configured for GAN model generation for a plurality of end user devices;

generating, by a first processor in communication with a memory, a key of a plurality of keys for perturbation of one or more model parameters of a GAN model, each key of the plurality of keys being computed from first-order sufficient conditions for decentralized attribution of respective outputs of a plurality of perturbed GAN models with an associated key of the plurality of keys;

verifying, by the processor, attribution of the key to a perturbed GAN model of the plurality of perturbed GAN models by implementing a linear classifier that returns positive only for outputs of the perturbed GAN model;

transmitting, from the processor and over a network, the GAN model and the key to an end user device of the plurality of end user devices;

perturbing, upon installation of the GAN model at a memory of the end user device, one or more model parameters of the GAN model based on the key to produce the perturbed GAN model such that an output generated by the perturbed GAN model at the user device is influenced by the key; and detecting, by application of the output of the GAN model as input to a classifier model, the output of the GAN model as being produced by the end user device by correlating one or more features of the output with the key.

6. The method of claim 5, the GAN model being one of a plurality of GAN models respectively distributed to the plurality of end user devices, the plurality of GAN models being respectively and uniquely modified using the plurality of keys upon installation at the plurality of end user devices.

7. The method of claim 5, further comprising installing an application to the end user device, the application including the GAN model and the key, the installation modifying the GAN model according to the key to output the perturbed GAN model verifiable by the key, and subsequently removing the key from the end user device.

* * * * *